United States Patent
Wagle et al.

(10) Patent No.: US 11,580,351 B2
(45) Date of Patent: Feb. 14, 2023

(54) AUTOMATED PERSONALIZED CLASSIFICATION OF JOURNEY DATA CAPTURED BY ONE OR MORE MOVEMENT-SENSING DEVICES

(71) Applicant: Microsoft Technology Licensing, LLC, Redmond, WA (US)

(72) Inventors: Justin James Wagle, Pacifica, CA (US); Nathaniel Gunther Roth, San Francisco, CA (US); Qian Liu, Redwood City, CA (US); Pnina Eliyahu, Walnut Creek, CA (US); Syed Farhan Raza, Fremont, CA (US); Timothy Edward Bellay, Oakland, CA (US); Rahul Anantha Padmanabha Udipi, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1072 days.

(21) Appl. No.: 16/198,853

(22) Filed: Nov. 22, 2018

(65) Prior Publication Data

US 2020/0143224 A1 May 7, 2020

Related U.S. Application Data

(60) Provisional application No. 62/756,420, filed on Nov. 6, 2018.

(51) Int. Cl.
*G06N 3/02* (2006.01)
*G07C 3/02* (2006.01)

(52) U.S. Cl.
CPC .................. *G06N 3/02* (2013.01); *G07C 3/02* (2013.01)

(58) Field of Classification Search
CPC .................... G06N 3/02; G07C 3/02
See application file for complete search history.

(56) References Cited

U.S. PATENT DOCUMENTS 9,558,664 B1 1/2017 Gaebler et al.
9,721,305 B2 8/2017 Bomze et al.
(Continued)

FOREIGN PATENT DOCUMENTS

CN 108459996 A 8/2018

OTHER PUBLICATIONS

Griffin, Terry, and Yan Huang. "A decision tree classification model to automate trip purpose derivation." The Proceedings of the ISCA 18th international conference on computer applications in industry and engineering. 2005. (Year: 2005).*

(Continued)

*Primary Examiner* — Michael J Huntley
*Assistant Examiner* — Sehwan Kim

(57) ABSTRACT

A technique is described herein for automatically logging journeys taken by a user, and then automatically classifying the purposes of the journeys. In one implementation, the technique obtains journey data from one or more movement-sensing devices as a user travels from a starting location to an ending location in a vehicle. The technique generates a set of features based on the journey data, and then uses a machine-trainable model (such as a neural network) to make its classification based on the features. The machine-trainable model accepts at least one feature that is based on statistical information regarding at least one aspect of prior journeys that the user has taken. Overall, the technique provides a resource-efficient solution that rapidly provides personalized results to individual respective users. In some implementations, the technique performs its personalization without sharing journey data with a remote server.

20 Claims, 10 Drawing Sheets

(56) References Cited

U.S. PATENT DOCUMENTS

| | | | | |
|---|---|---|---|---|
| 11,120,349 | B1* | 9/2021 | Wu | G06N 20/00 |
| 2013/0158866 | A1* | 6/2013 | Weir | G01C 21/3617 |
| | | | | 701/468 |
| 2014/0233398 | A1* | 8/2014 | Kountouris | H04W 12/12 |
| | | | | 370/242 |
| 2015/0198722 | A1* | 7/2015 | Ben-Akiva | G08G 1/0112 |
| | | | | 701/472 |
| 2017/0042483 | A1* | 2/2017 | Heldt | A61B 5/02108 |
| 2017/0241789 | A1* | 8/2017 | Shimada | G01C 21/343 |
| 2017/0372232 | A1* | 12/2017 | Maughan | G06F 3/0482 |
| 2018/0089561 | A1* | 3/2018 | Oliner | G06F 16/26 |
| 2018/0266839 | A1* | 9/2018 | Tajnai | G01C 21/3461 |
| 2018/0342033 | A1* | 11/2018 | Kislovskiy | G01C 21/3697 |
| 2018/0373854 | A1* | 12/2018 | Chou | G06F 21/31 |
| 2019/0073381 | A1* | 3/2019 | Minarik | G06Q 50/01 |
| 2019/0213451 | A1* | 7/2019 | Schäfer | G06V 10/10 |
| 2019/0295696 | A1* | 9/2019 | Yang | G16H 50/20 |

OTHER PUBLICATIONS

Xiao, Guangnian, Zhicai Juan, and Chunqin Zhang. "Detecting trip purposes from smartphone-based travel surveys with artificial neural networks and particle swarm optimization." Transportation Research Part C: Emerging Technologies 71 (2016): 447-463. (Year: 2016).*

Cardoso, Thiago NC, et al. "Ranked batch-mode active learning." Information Sciences 379 (2017): 313-337. (Year: 2017).*

Tanaka, Kohei, et al. "A destination prediction method using driving contexts and trajectory for car navigation systems." Proceedings of the 2009 ACM symposium on Applied Computing. 2009. (Year: 2009).*

Koh, Pang Wei, and Percy Liang. "Understanding black-box predictions via influence functions." International conference on machine learning. PMLR, 2017. (Year: 2017).*

Montini, Lara, and Nadine Rieser. Implementation and evaluation of learning routines for mode and trip purpose detection. ETH Zurich, 2014. (Year: 2014).*

Montini, Lara, et al. "Comparison of travel diaries generated from smartphone data and dedicated GPS devices." Transportation Research Procedia 11 (2015): 227-241. (Year: 2015).*

Kingma, et al., "Adam: A Method for Stochastic Optimization," in arXiv:1412.6980v9 [cs.LG], Jan. 30, 2017, 15 pages.

Srivastava, et al., "Dropout: A Simple Way to Prevent Neural Networks from Overfitting," in The Journal of Machine Learning Research, vol. 15, No. 1, Jan. 2014, pp. 1929-1958.

PCT Search Report and Written Opinion for PCT/US2019/058688, dated Jan. 16, 2020, 13 pages.

English language translation of Chinese patent document No. CN108459996A, available at https://patents.google.com/patent/CN108459996A/en?oq=cn+108459996, retrieved on Feb. 13, 2020, 6 pages.

* cited by examiner

OVERVIEW OF MODEL-ASSISTED
CLASSIFICATION PROCEDURE
1002

RECEIVE A MACHINE-TRAINABLE MODEL FROM A BACKEND SYSTEM, THE BACKEND SYSTEM BEING IMPLEMENTED BY ONE OR MORE SERVERS.
1004

RECEIVE JOURNEY DATA THAT DESCRIBES A JOURNEY TAKEN BY A USER USING A VEHICLE, THE JOURNEY DATA BEING AUTOMATICALLY CAPTURED IN RESPONSE TO THE USER MOVING FROM A STARTING LOCATION TO AN ENDING LOCATION AT A GIVEN TIME, THE JOURNEY DATA BEING GENERATED BASED ON SIGNALS PROVIDED BY AT LEAST ONE MOVEMENT-SENSING DEVICE ASSOCIATED WITH A USER COMPUTING DEVICE, AS THE USER TRAVERSES THE JOURNEY.
1006

GENERATE A SET OF FEATURES THAT CHARACTERIZE THE JOURNEY DATA.
1008

USING A MACHINE-TRAINABLE MODEL TO AUTOMATICALLY CLASSIFY A PURPOSE OF THE JOURNEY BASED ON THE FEATURES, TO GENERATE A PROPOSED CLASSIFICATION.
1010

PRESENT THE PROPOSED CLASSIFICATION ON A USER INTERFACE PRESENTATION, WITH ZERO, ONE, OR MORE OTHER PROPOSED CLASSIFICATIONS, THE USER INTERFACE PRESENTATION PRESENTING A FIRST GRAPHICAL CONTROL FOR CHANGING THE PROPOSED CLASSIFICATION TO ANOTHER CLASSIFICATION, AND A SECOND GRAPHICAL CONTROL FOR CONFIRMING ALL OF THE PROPOSED CLASSIFICATIONS IN THE USER INTERFACE PRESENTATION.
1012

RECEIVE AN INPUT SIGNAL THAT INDICATES THAT THE USER HAS CONFIRMED A SPECIFIED CLASSIFICATION OF THE JOURNEY BY ACTIVATING THE SECOND GRAPHICAL CONTROL, THE SPECIFIED CLASSIFICATION CORRESPONDING TO THE PROPOSED CLASSIFICATION OR A MODIFICATION TO THE PROPOSED CLASSIFICATION AS SELECTED BY ACTIVATING THE FIRST GRAPHICAL CONTROL.
1014

AUTOMATED PERSONALIZED CLASSIFICATION OF JOURNEY DATA CAPTURED BY ONE OR MORE MOVEMENT-SENSING DEVICES

This application claims the benefit of U.S. Provisional Application No. 62/756,420 (the '420 Application), filed on Nov. 6, 2018. The '420 Application is incorporated by reference herein in its entirety.

BACKGROUND

Current technology exists to record journey data as a user moves from place to place in a vehicle. But a user may have difficulty in subsequently interpreting and acting on this data.

SUMMARY

According to one illustrative implementation, a computer-implemented technique is described herein for automatically classifying journeys. Per a model-assisted classification procedure, the technique includes receiving journey data that describes a journey taken by a user using a vehicle. That journey data is automatically captured in response to the user moving from a starting location to an ending location at a given time, and is generated based on signals provided by at least one movement-sensing device associated with a user computing device, as the user traverses the journey. The technique also includes: generating a set of features that characterize the journey data; using a machine-trainable model to automatically classify a purpose of the journey based on the features, to generate a proposed classification; presenting the proposed classification on a user interface presentation; and receiving an input signal that indicates that the user has confirmed a specified classification of the journey, via interaction by the user with the user interface presentation. The specified classification corresponds to the proposed classification or a modification to the proposed classification as selected by the user. The technique further includes repeating a manual classification procedure and/or the model-assisted classification procedure a plurality of times, personalization of the machine-trainable model for the user increasing as the user successively provides input signals to manually classify journeys via the manual classification procedure and/or confirms specified classifications via the model-assisted classification procedure via the user interface presentation. More specifically, the personalization increases in response to, at least in part, progressive refinement of the set of features.

According to one illustrative aspect, the user interface presentation presents the proposed classification with zero, one, or more other proposed classifications. The user interface presentation also provides a first graphical control for changing the proposed classification to another classification, and a second graphical control for confirming all of the proposed classifications in the user interface presentation.

According to another illustrative aspect, the technique generates at least one feature for input to the machine-trainable model that is based on a statistical measure which describes some aspect of prior journeys taken by the user. For instance, for a given ending location associated with a journey, the technique can generate a feature that is based, at least in part, on a number of times that the user has visited that location for a particular purpose.

According to another illustrative aspect, the technique makes use of a relatively sparse feature set, together with a relatively small machine-trainable model (such as a relatively small neural network). These characteristics enable the technique to offer good performance (e.g., by providing fast response times). In addition, these characteristics allow the technique to make efficient use of processing, memory, and power resources. The sparsity of the feature set is attributable, in part, to the economy in which the feature set expresses the travel-related behavior of the user.

According to another illustrative aspect, the technique can perform its progressive personalization on a user computing device associated with the user. In some implementations, this allows the user to avoid sending private journey data to a remote server.

According to another illustrative aspect, the technique can perform its progressive personalization without retraining the machine-trainable model. This saves the computing resources that would otherwise go into the task of retraining the machine-trainable model.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 is a flowchart that shows an illustrative model-assisted classification procedure.

Figure 1:
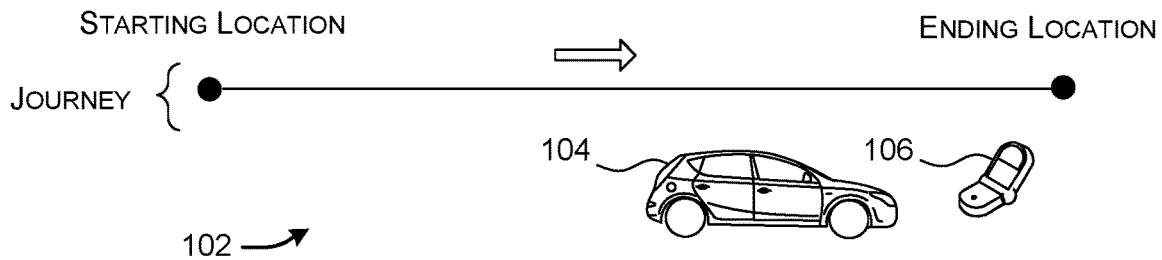
FIG. 1 shows an overview of a technique for automatically logging vehicular journeys taken by a user.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a journey-processing system for automatically logging and classifying journeys taken by a user. Section B sets forth illustrative methods which explain the operation of the journey-processing system of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. The term "component" or "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Journey-Processing System

A.1. Overview of System

FIG. 1 shows an overview of an environment 102 in which a journey-processing system automatically logs and classifies a journey made by a user, in response to the user moving from a starting location to an ending location in a vehicle 104. In the examples emphasized herein, the vehicle 104 may correspond to an automobile driven by the user over roadways. But, more generally, the vehicle 104 can correspond to any other mode of transformation, such as motorcycle, bicycle, etc. In the examples presented herein, the assumption is made that the user is the operator of the vehicle 104, although this need not always be the case.

During the trip, a computing device 106 captures movement information that describes the journey. For example, the computing device 106 may correspond to a handheld computing device that a user carries with him or her in the vehicle 104, such as a smartphone, tablet computing device, laptop computing device 106, etc. In other cases, the computing device 106 may correspond to a vehicle-mounted computing device, a wearable computing device of any type, a mixed-reality device of any type, or any other type of computing device. Further note that the user may use a first computing device (such as a smartphone) to record the journey, and a second computing device (such as a desktop computing device) to classify and report the journey; each such computing device can run a local instantiation of the journey-processing system.

Figure 2:
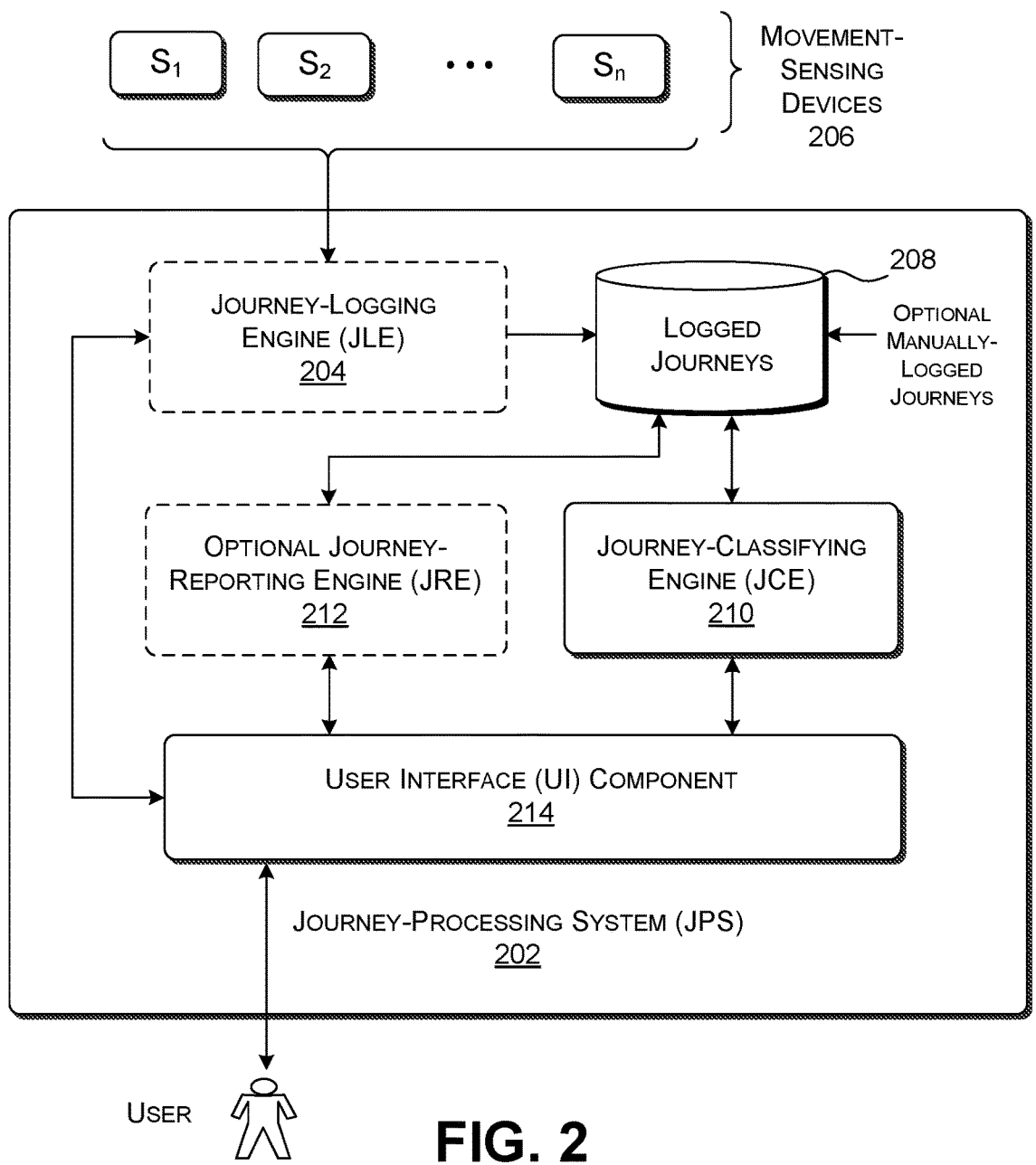
FIG. 2 shows a journey-processing system for automatically logging, classifying, and reporting journeys.

FIG. 2 shows a journey-processing system (JPS) 202 for automatically logging, classifying, and reporting journeys. A journey-logging engine (JLE) 204 performs the primary task of examining raw movement data from a plurality of movement-sensing devices 206. Each movement-sensing device detects the movement of the computing device 106. When the computing device 106 is located in the vehicle 104, each movement-sensing device therefore also implicitly captures movement of the vehicle 104. The movement-sensing devices 206 can include a Global Positioning System (GPS) component provided by the computing device 106. The GPS component determines the position of the computing device 106 using triangulation, based on signals transmitted by a set of cooperating satellites. A GPS component typically has an accuracy of a few meters. With less accuracy, other movement-sensing devices 206 can determine the position of the computing device 106 based on signals emitted by various terrestrial signal emitters, such as the cell towers of a communication system, WIFI access points, BLUETOOTH beacons, etc. In addition, the movement-sensing devices 206 can include any movement-sensing mechanisms provided by the computing device's Inertial Measurement Unit (IMU), such as one or more accelerometers, one or more magnetometers, one or more gyroscopes, and so on. These movement-sensing mechanisms can determine movement in six degrees of freedom.

Subsection A.3 (below) will provide details on one non-limiting implementation of the JLE 204. As a preview of that explanation, the JLE 204 collects the raw movement data and stores it in a data store. A candidate-detecting component determines whether a segment of movement data describes a possible journey, making it a candidate journey for additional processing. A journey validation component then determines whether the candidate journey is the kind of journey that warrants reporting to the user. For example, the journey validation component can determine whether the candidate journey has a requisite length to qualify as a journey, and whether its movement characteristics resemble vehicular movement, e.g., instead of walking, etc.

Generally, the JLE 204 operates in an entirely automatic manner. Hence, the user need not specifically instruct the JLE 204 when to start and stop recording a journey. The user simply ensures that he or she brings his or her computing device 106 along with him or her on a trip. Alternatively, the JLE 204 can allow a user to manually specify (or confirm) when a journey has started and ended.

Once validated, the JLE 204 can store salient information regarding the journey in a data store 208. In one implementation, the JLE 204 can specifically store any of the journey's starting location, ending location, starting time, ending time, distance, contextual factors pertaining to the journey, etc. In one implementation, the local computing device that records the journey maintains the data store 208. Alternatively, or in addition, a remote backend system (described below) can store a version of the data store.

A journey-classifying engine (JCE) 210 classifies the purpose of each journey. In the examples described herein, the JCE 210 specifically discriminates whether a drive has a business or personal purpose. But other implementations of the JCE 210 can discriminate among any number of categories. For instance, in another case, the JCE 210 can also discriminate among different kinds of business trips, and/or different kinds of personal trips. For example, the JCE 210 can be used to discriminate among trips that a contractor takes for different reasons, such as to provide services to different clients, and/or to perform different kinds of tasks. These types of classifications can assist the contractor in later generating invoices to describe the work that the contractor has completed at work sites to which he or she has driven.

Again, Subsection A.3 will set forth the operation of the JCE 210 in greater detail. By way of overview, the JCE 210 generates a set of features that characterize each journey to be classified. The JCE 210 then uses a machine-trainable model (such as a neural network) or statistical computation (such as a Bayesian computation) to determine the most likely classification of the journey, based on the features. The JCE 210 can store classified journeys in the data store 208, or in another data store (not shown).

As will be further described below, the JCE 210 rapidly learns the driving patterns associated with a user, and thus quickly provides accurate classifications. This aspect of the JCE 210 improves the user's satisfaction with the JPS 202, and reduces the probability that the user will abandon its use.

An optional journey-reporting engine (JRE) 212 provides a set of tools that allow the user to generate various reports. For example, the JRE 212 can include functionality that organizes the journeys that a user has taken within a reporting period into a report for submission to the government, or an employer, etc.

A user interface (UI) component 214 provides a series of graphical UI presentations that allows a user to interact with any of the JLE 204, the JCE 210, and the JRE 212. Subsection A.2, for instance, describes a series of graphical UI presentations through which the user may interact with the JCE 210. As described there, in a manual classification mode, the UI component 214 can present a first graphical UI presentation that allows a user to manually classify individual drives. In a model-assisted mode, the UI component 214 presents a second graphical UI presentation that allows a user to confirm a set of automatically-classified journeys, with or without modification. Alternatively, or in addition, the UI component 214 can provide a voice-controlled interface, e.g., using the CORTANA virtual agent provided by MICROSOFT CORPORATION of Redmond, Wash. A voice-controlled interface uses voice recognition technology to detect the speech of the user, and uses a voice synthesizer to provide vocalized instructions to the user.

As a final point regarding FIG. 2, note that the JPS 202 can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.), particularly with respect to any data maintained by the backend system 306.

Figure 3:
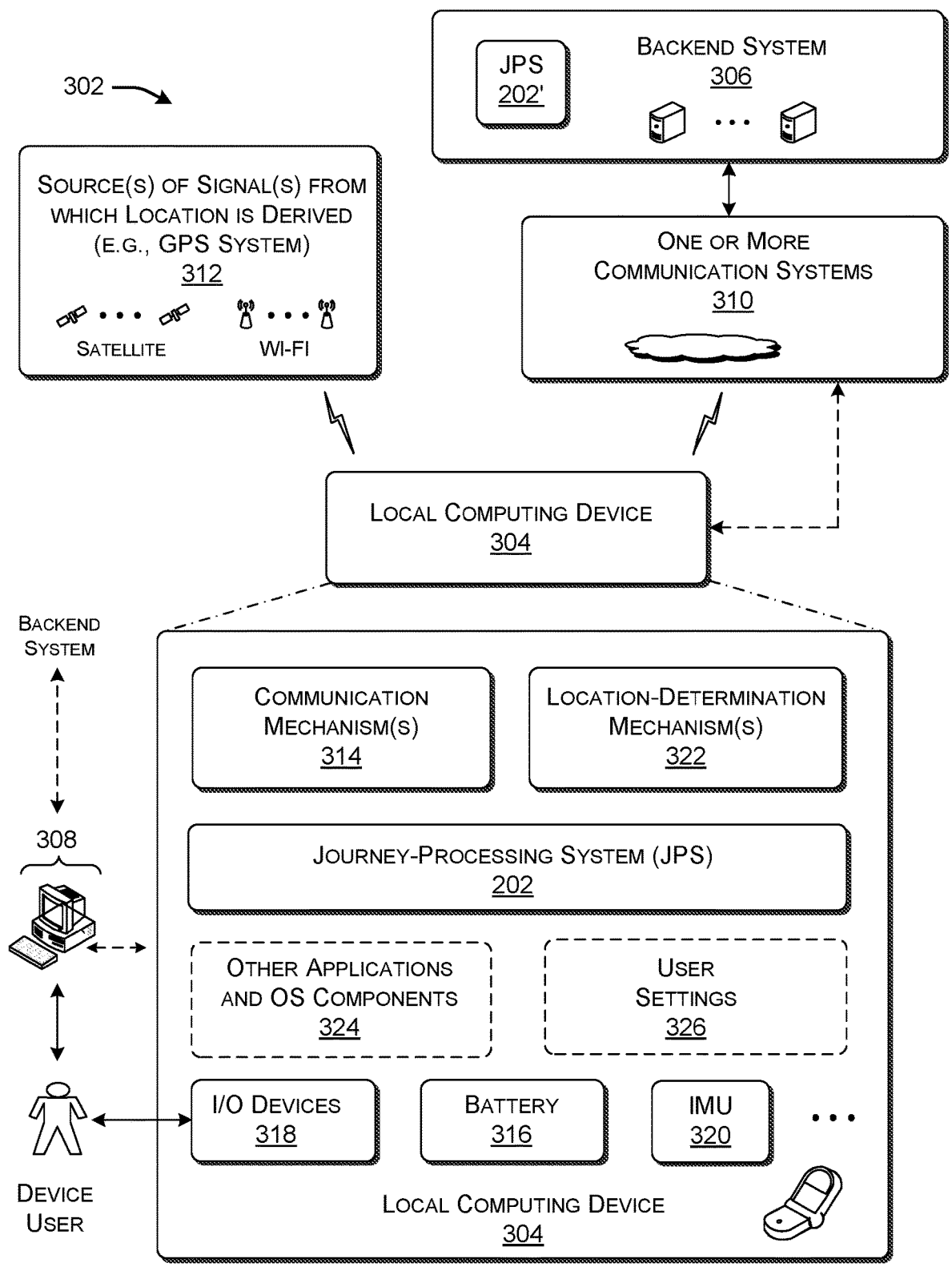
FIG. 3 shows one environment in which the journey-processing system of FIG. 2 may be used.

FIG. 3 shows one environment 302 in which the journey-processing system (JPS) 202 of FIG. 2 may be used. In this environment 302, a local user computing device 304 implements at least part of the JPS 202. For example, the local user computing device 304 may correspond to the same computing device 106 shown in FIG. 1 that the user carries while on his or her drives. More specifically, the local computing device 304 can correspond to, without limitation, a smartphone, tablet computing device, electronic book reader device, laptop computing device, vehicle-borne computing device, wearable computing device, mixed-reality device, and so on.

In some implementations, a backend system 306 can implement at least some aspects of the JPS 202; FIG. 3 makes this point by showing that the backend system 306 can include its own local instantiation of the JPS 202, represented in FIG. 3 as JPS 202'. For example, the JPS 202' at the backend system 306 can include a training engine (described below) that generates a machine-trainable model for use by the local computing device 304 in classifying drives. The backend system 306 can be implemented by one or more servers, provided at a single location or distributed over plural locations.

In addition, another local computing device 308, such as a desktop computing device, can optionally implement other aspects of the JPS 202. For example, a user may rely on the local computing device 304 to capture candidate journeys, and rely on the other local computing device 308 to classify the journeys and to perform various reporting functions associated with the JRE 212. The other local computing device 308 can communicate directly with the backend system 306 via any digital network (such as the Internet), and/or the local computing device 304 via a local communication channel (such as WI-FI, BLUETOOTH, etc.).

One or more communication systems 310 provide a communication service (or services) to the local computing device 304 (and optionally to the computing device 308).

The communication system(s) 310 may correspond to different cellular network platforms provided by different respective commercial entities. Each cellular network platform can include one or more base stations, one or more cell towers, etc. The communication system(s) 310 may also provide connectivity to other digital networks, such as the Internet. The communication system(s) 310 also provides access to the backend system 306.

FIG. 3 also generally shows one or more sources 312 of signals from which location may derived. For example, the source(s) 312 may include a set of Global Positioning System (GPS) satellites and associated equipment which provide GPS signals. The source(s) 312 may also include a set of WI-FI access points. The source(s) 312 may also include a set of cell phone towers. The cell phone towers correspond to part of the communication system(s) 310. A database (not shown) stores the known locations of the WI-FI access points and cell phone towers.

Now referring to the illustrative local computing device 304, this computing device 304 includes one or more communication mechanisms 314 for handling wireless interaction with various external entities. Each communication mechanism can include a wireless transmitter and/or receiver for transmitting/receiving wireless signals within a specific communication band and subject to a specific communication protocol. The computing device 304 also includes a rechargeable battery 316 which supplies power to the computing device 304, input and output devices (I/O devices 318), and an inertial measurement unit (IMU) 320. The I/O devices 318 can include a display device, a speaker, a touch-sensitive display surface, a microphone, a camera, etc. The IMU 320 can include one or more accelerometers, one or more gyroscopes, one or more magnetometers, etc.

The computing device 304 can also include hardware logic circuitry (described in Section C) for implementing various functions. For instance, one or more location-determination mechanisms 322 enable the computing device 304 to determine its location based on wireless signals transmitted by the external source(s) 312. For example, one such location-determination mechanism corresponds to a GPS component which uses triangulation to determine the position of the computing device 304 based on signals transmitted by the GPS system's satellites. Another location-determination mechanism determines the position of the computing device 304 based on beacon signals transmitted by WI-FI access points having respective known positions, BLUETOOTH beacons, etc.

The hardware logic circuitry also implements the JPS 202, or part thereof. The computing device 304 can also host one or more other applications and operating system (OS) components 324 that perform various functions. The computing device 304 can also store information 326 regarding the user's settings and preferences, where the "user" corresponds to the person who owns or otherwise controls the computing device 304.

A.2. Illustrative User Interface Experience

Figure 4:
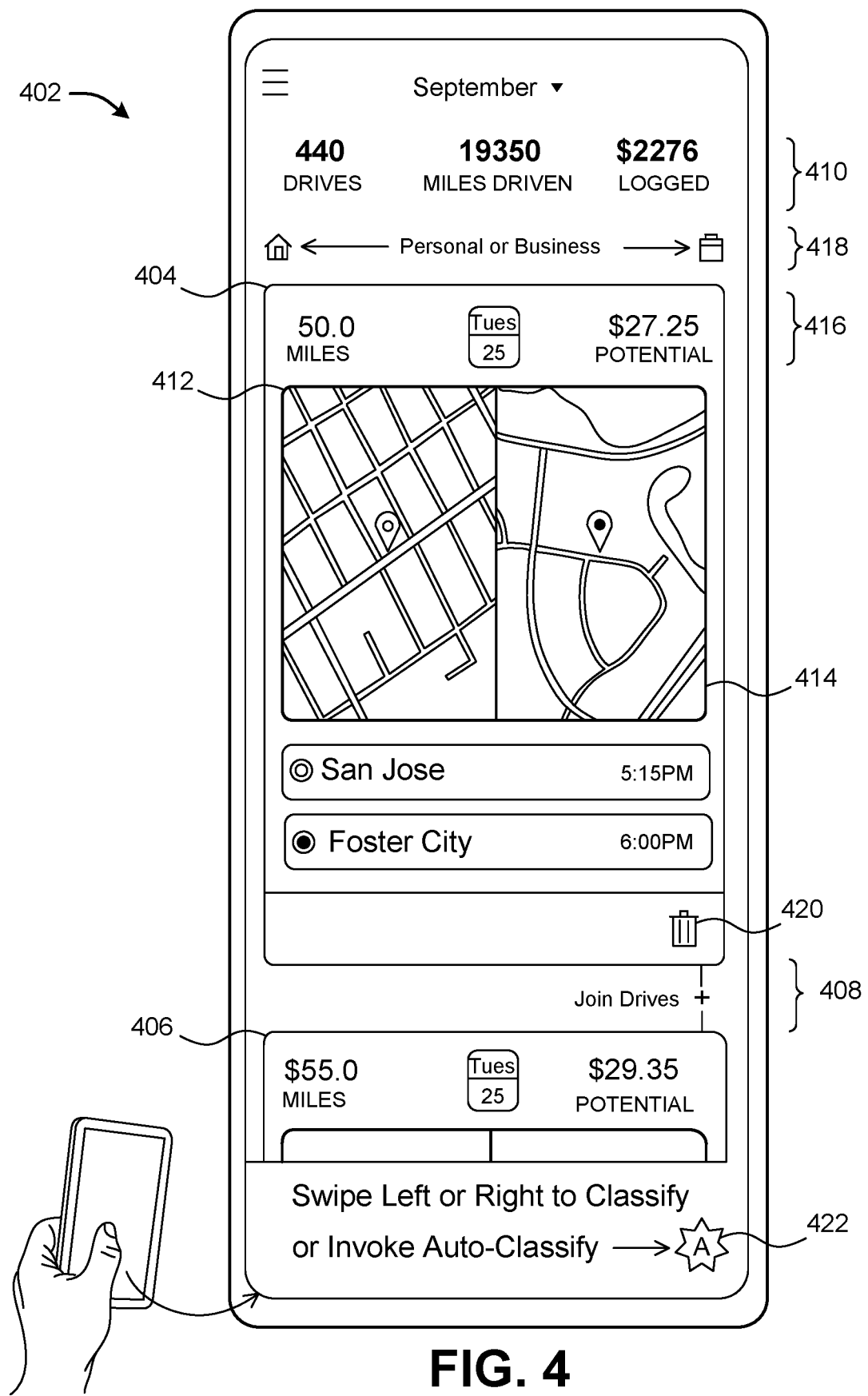
FIG. 4 shows an illustrative user interface presentation that allows a user to manually classify a journey.

FIG. 4 shows an illustrative user interface presentation 402 that allows a user to manually classify individual journeys, per a manual classification procedure. In one merely illustrative case, assume that the computing device 304 provides the user interface presentation 402. Further assume that the computing device 304 employs a touch-sensitive display screen which detects the user's interaction with the screen using conventional touch-screen technology, such as capacitive technology. As mentioned above, the UI component 214 can alternatively, or in addition, interact with the user via a voice-controlled interface.

In one implementation, the UI component 214 presents a graphical card associated with each journey that identifies salient information regarding that journey. For example, the UI component 214 can present a first graphical card 404 associated with a first journey and a second graphical card 406 associated with a second journey. The user may scroll down to see additional graphical cards associated with other respective journeys.

In one implementation, the UI component 214 can present the journeys in a consecutive order based on the time that they occurred. For example, the user is currently viewing journeys completed on September $25^{th}$ of a particular year. The UI component 214 can list the journeys completed on that day in chronological order, from top to bottom, or vice versa. A graphical prompt 408 invites the user to combine any two consecutive graphical cards (and associated journeys) based on the user's assessment that they represent a single journey.

In addition, or alternatively, the UI component 214, in cooperation with the JCE 210, can encourage the user to classify certain journeys prior to other journeys. For example, the JCE 210 can identify a subset of journeys that, when classified, will improve the ability of the JCE 210 to determine the user's patterns of travel, more so than the user's classification of other journeys. In one such case, the JCE 210 can determine that it would be desirable for the user to classify a journey that follows or precedes an already-classified journey. Based on this information, the JCE 210 can more accurately compute a set of features (described below) which depend on knowledge of the sequence of classifications made by the user. In another case, the JCE 210 can determine that it would be desirable for the user to classify a journey that has a level of confidence below a prescribed threshold value. Based on this information, the JCE 210 can resolve ambiguity in the user's pattern of driving, more so than had the user classified a journey that the JCE 210 is able to process with high confidence. Any journey that the JCE 210 designates as preferred for the kind of reasons stated above is referred to below as a high-value journey.

The UI component 214 can encourage the user to classify one or more high-value journeys using various techniques. For example, the UI component 214 can modify the order of the journeys as presented to promote high-value journeys, e.g., by presenting them first. Alternatively, or in addition, the UI component 214 can present targeted messages to the user which invite the user to classify high-value journeys. Alternatively, or in addition, the UI component 214 can highlight a graphical card associated with each high-value journey. Alternatively, or in addition, the UI component 214 can offer a reward to the user for classifying a high-value journey, and so on.

The user interface presentation 402 includes high-level information 410 which describes the user's driving behavior within a prescribed interval of time, such as the currently-designated year, or a currently-designed month, etc. In this case, the high-level information 410 indicates that the user has made 440 drives for a total of 19,350 miles driven. The high-level information 410 can also provide a total monetary amount associated with the drives made by a user. For example, the high-level information 410 can indicate that the user has designated a set of business drives that accrue to a value of $2,276. In one context, this is the amount that the user may claim as a business expense.

The graphical card 404 describes salient information regarding one illustrative journey, in this case, from San Jose, Calif. to Foster City, Calif., which occurred on September 25$^{th}$. The graphical card 404 can provide a first graph snippet 412 that shows the starting location of the journey, and a second graph snippet 414 that shows the ending location of the journey. The graphical card 404 also identifies the times at which the user began and ended the journey. The graphical card 404 also provides high-level per-journey information 416 that shows the distance (50 miles) associated with the journey, and the value ($27.25) associated with the journey that may be claimed by classifying it as "business."

In one implementation, the UI component 214 can allow the user to classify the journey associated with the graphical card 404 via a graphical control 418, e.g., by swiping left (for personal) or right (for business) in a region of the graphical user interface presentation 402. The computing device 304 detects the user's action performed on its touch-sensitive display screen, and classifies the journey accordingly. Alternatively, the user may choose to delete the journey by selecting a trash icon 420. In a multi-class implementation, the UI component 214 can allow the user to select a classification via a drop-down menu or other type of graphical control feature.

Finally, a graphical prompt 422 invites the user to invoke a model-assisted classification mode. In this mode, the JCE 210 automatically classifies a set of journeys and presents the results to the user for confirmation. In one implementation, the UI component 214 can present the graphical prompt 422 at all times to the user. In another implementation, the UI component 214 only presents the graphical prompt 422 after the user has manually classified a predetermined number of journeys, or in response to some other environment-specific threshold condition having been reached. By delaying the presentation of the graphical prompt 422, the UI component 214 can better ensure that the classifications it generates have a requisite degree of accuracy. In one case (not shown), the UI component 214 may also apprise the user as to their progress toward completing the requisite number of classifications, e.g., by providing a gauge-type graphical feature.

Figure 5:
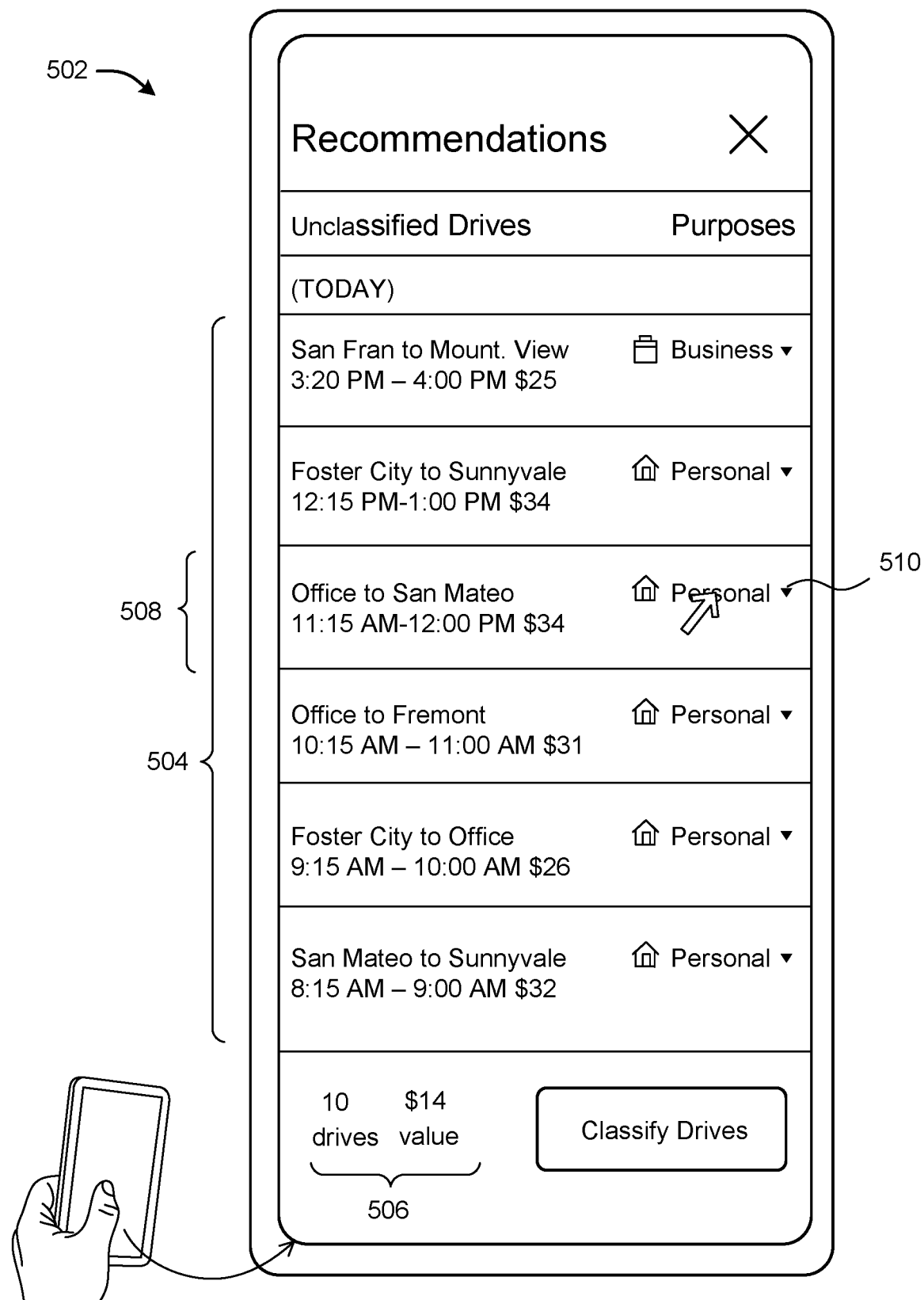
FIG. 5 shows an illustrative user interface presentation that shows a batch of proposed classifications that the journey-classifying system has automatically made.

FIG. 5 shows an illustrative user interface presentation 502 that the UI component 214 generates for the model-assisted classification mode, e.g., in response to the user activating the graphical prompt 422. The user interface presentation 502 shows a batch 504 of proposed classifications automatically made by the JCE 210.

In one implementation, the UI component 214, in cooperation with the JCE 210, presents a set of n proposed classifications for n respective journeys. In one non-limiting case, n is 10. FIG. 5 only shows six of those ten journeys, but assume that the user may review additional journeys in the batch 504 by scrolling down or up in the list of journeys. In one implementation, the JCE 210 may present a limited batch of journeys for proposed classification for strategic reasons. For instance, the JCE 210 may invite the user to classify ten journeys so that it can improve the personalization of the features (which it feeds to a machine-trainable model). After doing this, the JCE 210 can invite the user to classify another set of ten journeys. The generation of this subsequent set of 10 journeys will benefit from the knowledge that the JCE 210 has gleaned from the preceding set(s) of classified (and now confirmed) journeys.

In one implementation, the JCE 210 can select the set of n journeys for automatic classification by choosing a sequence of consecutive journeys that the user has taken, starting from a given starting time or journey specified by the user. Alternatively, or in addition, the JCE 210 can choose the set of n journeys for classification such that it includes at least some high-value journeys. For instance, the JCE can invite the user to classify a particular journey because the user has already classified a temporally preceding or subsequent journey. By receiving this classification, the JCE 210 can provide a more robust collection of features.

In one case, the JCE 210 arranges the n journeys in the order in which they were made by the user. Alternatively, or in addition, the JCE 210 can arrange the n journeys based on the confidence levels associated with the journeys. Alternatively, or in addition, the JCE 210 can arrange the n journeys so as to emphasize one or more high-value journeys, and so on.

In this merely illustrative example, the JCE 210 has classified all of the journeys in the batch 504 as personal, except for the first-specified journey. The UI component 214 also shows high-level information 506 that specifies the current value of the classified journeys ($10); this value is attributed to the single journey that the user has classified as business.

The user can selectively change the proposed classification of any journey in the batch 504. For instance, the user can tap on the proposed classification in the batch 504 to toggle its classification from personal to business, or from business to personal. (In other cases, the user can select from among three or more possible classifications, e.g., by tapping on a drop-down menu and then selecting a desired classification, by selecting a checkbox or radio button in a set of such checkboxes or radio buttons, by selecting an option in a radial menu, by selecting a setting on a multi-position slider bar, etc.) In the example of FIG. 5, the user is currently in the process of changing the classification of a particular journey 508 from "personal" to "business" via a graphical control 510.

Figure 6:
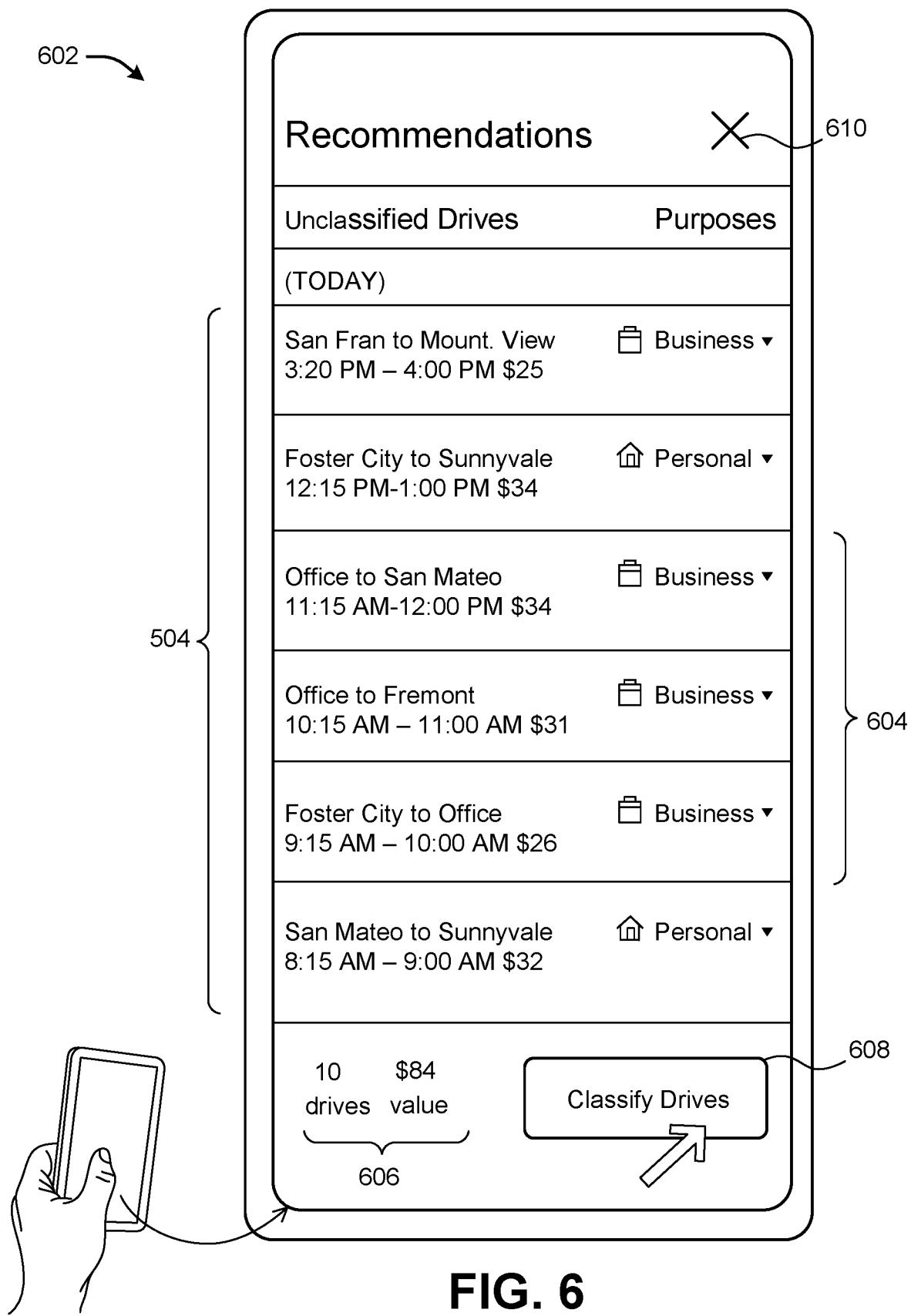
FIG. 6 shows the user interface presentation of FIG. 5 after the user has changed a subset of initial classifications shown in FIG. 5.

Advancing to FIG. 6, this figure shows the state of a user interface presentation 602 after the user has changed a subset 604 of journeys from "personal" status to "business" status. The UI component 214 reacts by displaying updated high-level information 606, which shows an update to the total value associated with the classified journeys in the batch 504. This value has increased because the user has classified three more journeys as "business." When the user is satisfied that all of the classifications in the batch 504 are correct, the user may tap a graphical control 608.

The JCE 210 will respond to the user's action by storing the specified classifications in the batch, designating them as confirmed. The JCE 210 may then repeat the above model-assisted classification procedure with respect to the next ten journeys. That is, the JCE 210 can automatically classify the next ten journeys, display the proposed classifications to the user, and then receive the user's confirmation of these classifications, with or without modification. As noted above, the JCE 210 can potentially improve its classification of each new set of ten journeys based on the knowledge gleaned from the previous set(s) of journeys. The user can exit the model-assisted classification mode at any time, e.g., by pressing an exit command 610.

In some implementations, the JCE 210 can phase out the user experience shown in FIGS. 5 and 6 when its model reaches a required degree of accuracy. The JCE 210 can determine accuracy using any criteria, such as the percentage of classifications that a user modifies within a set of proposed classifications. Or the JCE 210 can consider the number of classifications that the user has made and/or confirmed as a proxy of accuracy. When the desired degree of accuracy is reached, the JCE 210 can automatically classify journeys and send those classifications to the journey reporting engine (JRE) 212, that is, by skipping the user experience shown in FIGS. 5 and 6, or making that experience optional. However, the JRE 212 still gives the user the opportunity to confirm the correctness of the classifications while reviewing the final report. Further, the JCE 210 can continue to learn based on the confirmations and modifications that the user makes during the reporting stage. Therefore, this later phase of operation may still be regarded as a form of the model-assisted classification.

A.3. Journey-Logging Engine and Journey-Classifying-Engine

Figure 7:
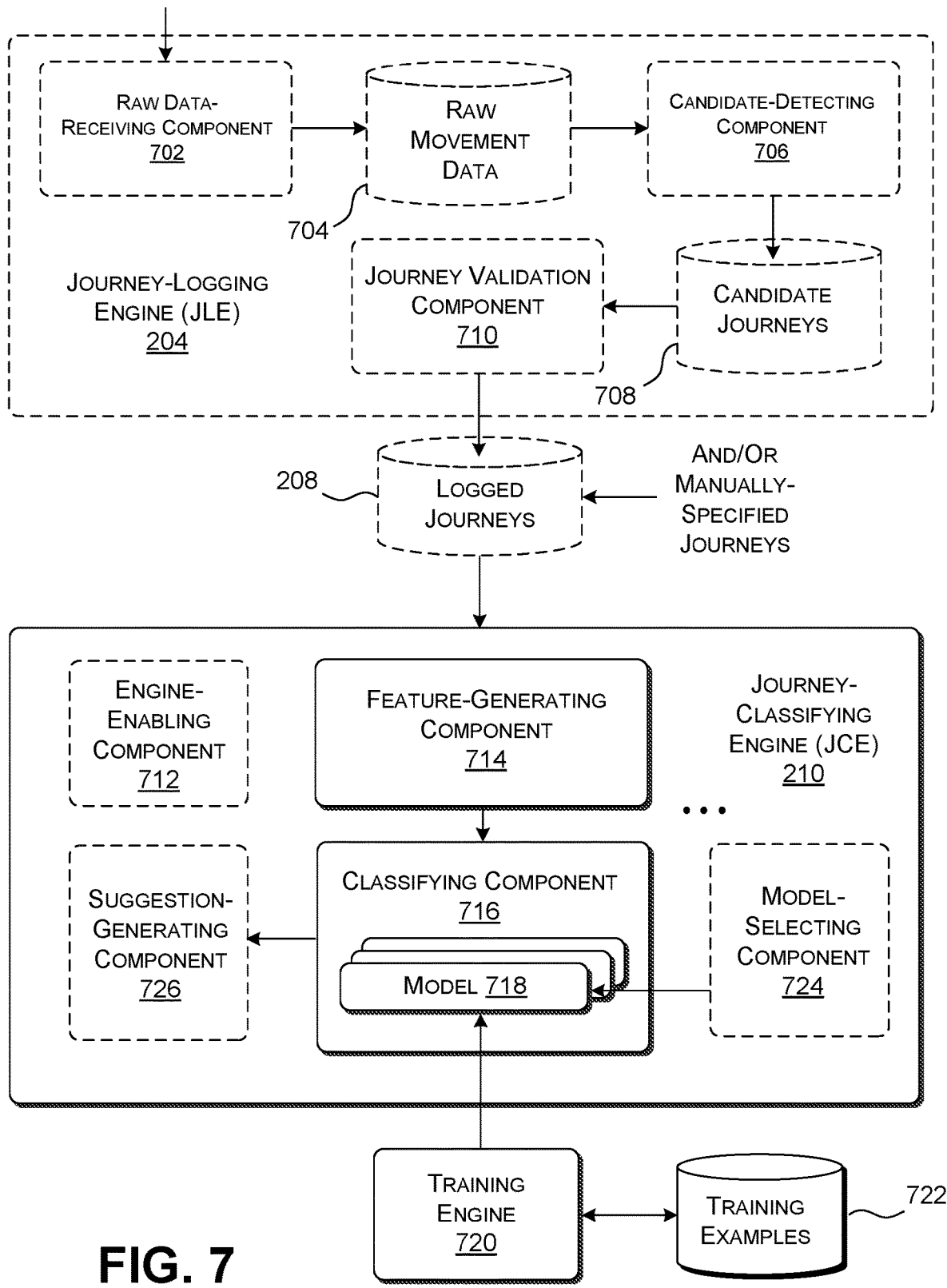
FIG. 7 shows one implementation of a journey-logging engine and a journey-classifying engine, which are two components of the journey-processing system of FIG. 2.

FIG. 7 shows one implementation of a journey-logging engine (JLE) 204 and a journey-classifying engine (JCE) 210. Referring first to the JLE 204, a raw data-receiving component 702 receives raw movement data from one or more movement-sensing devices 206. As described above, the movement-sensing devices 206 can include various types of location-determination mechanisms 322 described above (such as a GPS component, etc.), the IMU 320 (including one or more accelerometers, etc.), and so on. In one implementation, the raw data-receiving component 702 receives the raw movement data at a prescribed sampling frequency, such as 1 Hz. The raw data-receiving engine 702 stores the raw movement data in a data store 704.

A candidate-detecting component 706 determines whether a temporal segment of movement data corresponds to a candidate journey. The candidate-detecting component 706 can perform this task by detecting a departure event followed by an arrival event. A departure event indicates that a user has started a journey. An arrival event indicates that the user has arrived at an ending location. If the candidate-detecting component 706 detects this pair of events, it stores the movement data that occurs between these events in a data store 708, which it designates as a candidate journey.

The candidate-detecting component 706 can detect departure events and arrival events in various ways, such as by using a set of discrete rules. For example, one such rule can indicate that a user has potentially commenced a journey if the user moves outside a predetermined geographic radius associated with a currently-established stable location of the user. That stable location, in turn, may correspond to the last point of arrival identified by the JLE 204. Another rule can indicate that, after commencing movement, the user has reached an ending location if the user remains at the location for more than a prescribed amount of time.

Alternatively, or in addition, the candidate-detecting component 706 can use any type of pattern-matching technique to determine whether a segment of movement data corresponds to a journey. In one implementation, the candidate-detecting component 706 can perform pattern matching using one or more machine-trainable models, such as, but not limited to, a Recurrent Neural Network (RNN). Alternatively, or in addition, the candidate-detecting component 706 can use one or more other temporal pattern-matching techniques that do not employ machine-trainable models. For example, the candidate-detecting component 706 can use the Dynamic Time Warping (DTW) technique or a frequency-based technique to compare a segment of movement data with one or more telltale patterns.

Note that the candidate-detecting component 706 can store a geofence that describes the current location of the computing device 304 when the JPS 202 is shut down for any reason, e.g., by defining a perimeter around the current location of prescribed radius. The operating system of the computing device 304 can reactivate the JPS 202 if it determines that the geofence has been broken, indicating that the user has moved. By virtue of this behavior, the JPS 202 need not be continuously running in order to detect candidate journeys.

A journey validation component 710 determines whether each candidate journey in the data store 708 corresponds to a likely drive taken by a user. Like the candidate-detecting component 704, the journey validation component 710 can perform its operation using any combination of rules-based processing, one or more machine-trainable models, and/or one or more other kinds of pattern-matching tools.

More specifically, the journey validation component 710 can perform this operation using a series of stages of analysis. For example, in a first stage, the journey validation component 710 can fuse two or more consecutive candidate journeys together if it determines that they correspond to the same journey. The journey validation component 710 can make this determination, in turn, if any pair of candidate journeys is separated by less than a prescribed amount of time.

In another stage, the journey validation component 710 can discard a candidate journey if its movement data does not match the telltale characteristics of driving. The journey validation component 710 can make this determination using any of the above-described pattern-matching techniques. For instance, the journey validation component 710 can apply this processing to discriminate between movement data associated with driving a vehicle and movement data associated with walking, etc.

In another stage, the journey validation component 710 can discard a candidate journey if its length is below a prescribed minimum threshold length, or above a prescribed maximum threshold length. The journey validation component 710 can determine the distance of a candidate journey by computing the distance between its starting and ending locations on a sphere. Alternatively, or in addition, the journey validation component 710 can determine the distance between these two points by consulting a database that provides map information (including route information and associated distances). Alternatively, or in addition, the journey validation component 710 can determine the distance between these two points by adding two or more sub-segments that make up the candidate journey; this approach will prevent the journey validation component 710 from inappropriately discarding any journey for which the starting and ending locations are the same, or in close proximity to each other.

In another phase, the journey validation component 710 can discard a candidate journey if the movement data conforms to the schedule associated with a mode of public transportation, and so on. To perform this task, the journey validation component 710 can consult a database which describes the movement patterns associated with public transportation.

The journey validation component 710 can provide yet other analysis of candidate journeys; the above-described stages are presented in the spirit of illustration, not limitation. In other cases, the journey validation component 710 can perform two or more of the stages in parallel.

As noted above, the JLE 204 can alternatively be entirely omitted. In that case, the user can manually designate the start and stop of each journey. The user can perform this task at the beginning and end of the journey by pressing a start and stop command, respectively, on a user interface presentation (not shown) provided by the UI component 214. In response to this pair of actuations, the JPS can store a journey for analysis by the JCE 210.

The journey validation component 710 stores each qualifying journey in the data store 208. In one implementation, the journey validation component 710 stores salient information regarding each qualifying journey, such as its starting location, ending location, length, starting time, ending time, etc. More generally, the set of information that characterizes each journey in the data store 208 is referred to as journey data herein.

Now referring to the journey-classifying engine (JCE) 210, this component can optionally provide an engine-enabling component 712 that determines when to enable the JCE 210. Once enabled, the JCE 210 can provide its classification recommendations to the user via the user interface presentations (502, 602) described in Subsection A.2. For example, the engine-enabling component 712 can enable the JCE 210 when the user has classified a predetermined number of journeys. In another implementation, the engine-enabling component 712 is not used, and the JCE 210 provides its recommendations to a user any time a user requests them.

Once invoked by a user, a feature-generating component 714 can generate a set of features that characterize each journey under consideration. Additional information regarding the operation of the feature-generating component 714 is provided below in the context of the explanation of FIG. 8. A classifying component 716 then uses any type of machine-trainable model 718 or statistical model to map the set of features to a determination of the most likely classification of the journey under consideration. Again, additional information regarding the operation of the classifying component 716 is set forth below in connection with FIG. 8. As described there, the classifying component 716 may correspond to a neural network of any type(s), such as a feed-forward neural network. In that case, the model 718 corresponds to a set of weight values produced by a training engine 720.

In one implementation, the training engine 720 generates the weight values by iteratively operating on a set of training examples in a data store 722. In one case, each training example can correspond to journey data associated with an observed journey, together with a label that identifies the accepted classification of that journey (e.g., as defined by a user who has taken the journey). Other (negative) training examples can provide inaccurate pairings of journeys and classifications. The training engine 720 can use any technique to generate the weight values, such as the well-known gradient descent technique. This technique involves processing a training example using the machine-trainable model 718 in its current state of development, to produce an output result. The technique compares the output result with the known classification of the journey, to generate error information. The technique then back-propagates this error information through the machine-trainable model 718, adjusting the weight values of the model 718 in the process. The training engine 720 repeats this operation until the model 718 produces classification results having a prescribed degree of accuracy. In other approaches, the training engine 720 can dynamically adjust the rate of learning performed by the training engine 720.

In the specific case of neural networks, the training engine 720 can also optionally apply a dropout technique in training the model. That technique involves randomly removing units from the neural network during training at a probability of p, e.g., which can be set to any environment-specific value, such as 0.5, 0.7, 0.9, etc. In the trained neural network, the technique retains all of the units, but weights them by the same probability p. This technique reduces the chances that the training engine 720 will produce a trained model that suffers from overfitting; a model has this problem when it adequately mirrors the training examples, but not new data outside the scope of the training set.

In one implementation, the backend system 306 (of FIG. 4) can implement the training engine 720. In that case, the training engine 720 can perform its training operation on any basis, such as a periodic basis, and/or an on-demand basis. As to the training set, the training engine 720 performs its training on examples associated with different users. This yields a user-agnostic or global trained model. Or the training engine 720 can perform its training for different subsets of training examples associated with different classes of people having different respective travel behaviors. This operation will produce different class-specific models. Upon completion of training, the training engine 720 can download an appropriate model to each local user computing device.

In yet another implementation, the training engine 720 can generate a customized model for each user. The training engine 720 can perform this task based on a set of training examples that describe classified journeys associated with each user. The training set can optionally also include training examples associated with other users. The training engine 720 then downloads each user-specific model to its appropriate user.

In another implementation, each local computing device 304, associated with a particular user, can retrain its local version of a model (instead of relying on the backend system 306 to perform this task). The local computing device 304 performs this training based on training examples available to it, which correspond to those journeys classified by its user. The local computing device 304 can then use its custom-generated model to classify journeys for the user. This local manner of operation also does not require the user to send journey data to the backend system 306, thereby accommodating those users who prefer not to share journey data with the backend system 306.

In addition, the local computing device 304 can transmit its locally-computed model weight values to the backend system 306. The backend system 306 can then update a global or class-specific model based on the local model weight values provided by different local computing devices. For instance, the backend system 306 can perform this updating operation by averaging the weight values provided by different local computing devices. This manner of operation constitutes federated or distributed training that reduces the processing burden placed on the backend system 306. It also does not require sending raw journey data to the backend system 306.

The training engine 720 can use yet other training strategies to produce the model 718, such as early-stopping, etc. The above-described strategies are presented in the spirit of illustration, not limitation. Further, if training examples are not available, the training engine can use transfer learning to train the model 718 based on a surrogate set of training data.

Regardless of what training delegation strategy is used, the training engine 720 can perform training in an efficient manner based, in part, on the JPS's use of a concise feature set. That is, by virtue of its sparse representation of each journey, the training engine 720 can converge on an acceptable solution more quickly, using fewer training examples, compared to an implementation that uses a less sparse representation.

In other implementations, the classifying component 716 can provide a set of models of any type(s). In that case, an optional model-selecting component 724 determines what model to apply at any given time to classify a particular journey under consideration. In one approach, the model-selecting component 724 selects a first model when the number of manual classifications made by a user is below a prescribed threshold value. Above that threshold value, the model-selecting component 724 employs a second model. In one approach, the second model is more fine-tuned than the first model, but may require a prescribed number of prior classifications to function in a desirable manner. For example, the second model can correspond to a neural network having more layers, more units per layer, and/or a more complex architecture compared to a neural network associated with the first model.

Finally, a suggestion-generating component 726 can select a subset of classification results provided by the classifying component 716, and can arrange these results in any manner. In one case, the suggestion-generating component 726 arranges journeys in the order in which they occurred, and/or by confidence level associated with their classifications, and/or to emphasize high-value journeys, etc. (Note that the classifying component 716 specifies the confidence level of each of its classifications.)

Figure 8:
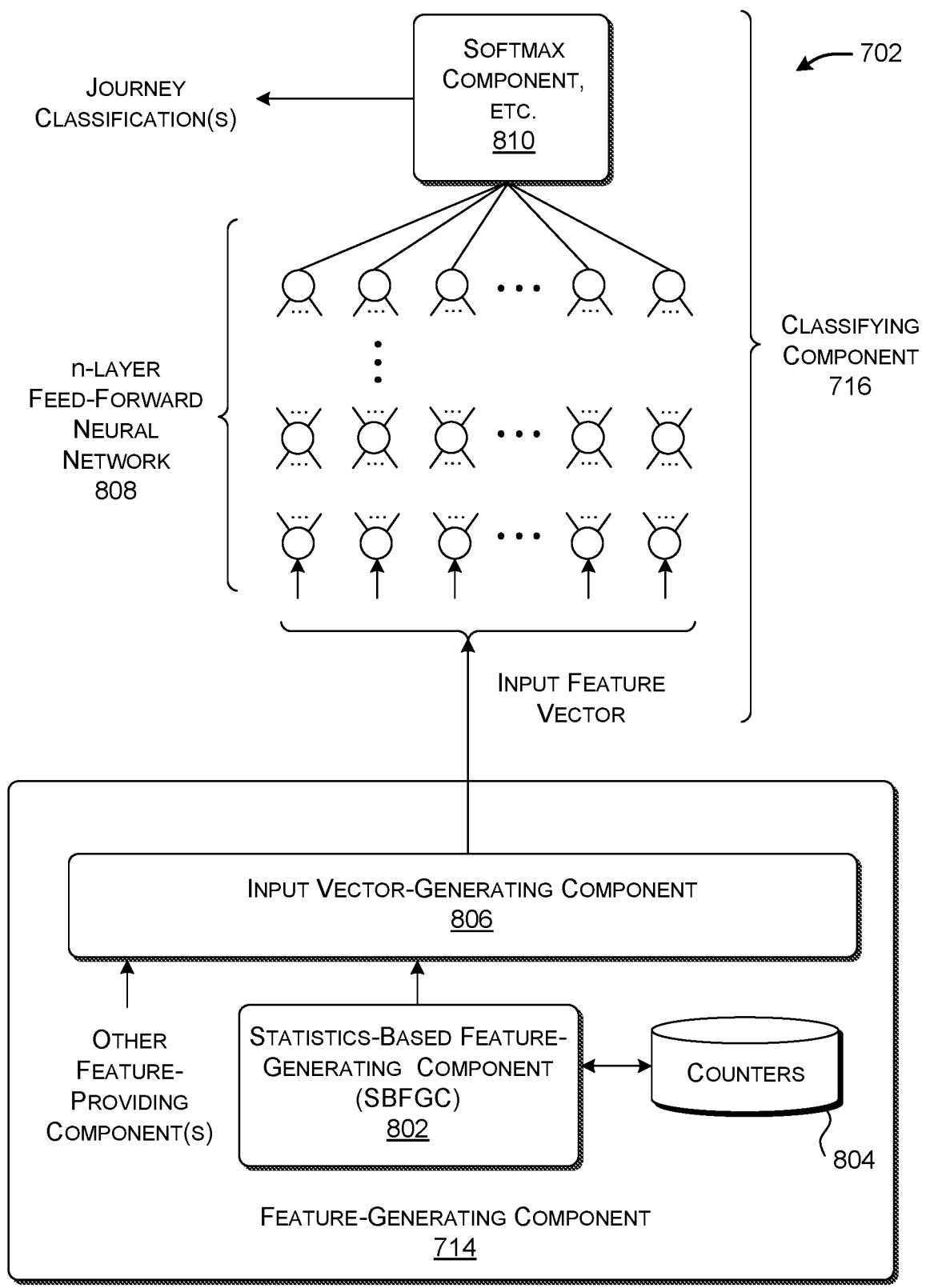
FIG. 8 shows further illustrative details regarding the journey-classifying engine of FIG. 7.

FIG. 8 shows one non-limiting implementation of the JCE 210 of FIG. 7. Referring first to the feature-generating component 714, this component generates a collection of features which describe a particular journey. To this end, the feature-generating component 714 can provide different kinds of a feature-providing components, each of which provides different kinds of features.

For instance, a statistics-based feature-generating component (SBFGC) 802 generates one or more features that reflect a statistical summary of at least one aspect of the prior journeys that a user has taken. For example, assume that a journey ($J_c$) to be classified is associated with a particular starting location $L_X$, particular ending location $L_Y$, particular starting time $T_X$, particular ending time $T_Y$, particular distance d (between $L_X$ and $L_Y$), etc. The SBFGC 802 can generate a first feature which depends on a count of journeys that the user has previously taken to that ending location $L_Y$ for business purposes. The SBFGC 802 can generate a second feature which depends on a count of journeys that the user has taken at the specified ending time $T_Y$ for business purposes, regardless of destination location. The SBFGC 802 can generate a third feature that describes the median distance (or any other statistical measure) of the journeys that the user has taken for business purposes. The SBFGC 802 can generate counterpart features that characterize the journeys that the user has taken for personal reasons. The SBFGC 802 can calculate yet other statistical-based features.

To generate the above-described types of statistical features, the SBFGC 802 maintains a running tally of count information (and/or other statistical measures) in a data store 804. The SBFGC 802 updates the data store 804 each time that the user manually classifies a drive (per the manual classification procedure of FIG. 4) or confirms a set of drives (per the model-assisted classification procedure of FIGS. 5 and 6).

More specifically, in one non-limiting implementation, the SBFGC 802 can calculate the following features.

Location.

Again assume that the user has traveled to location $L_Y$. Further assume that the JPS 202 originally represents this location using longitude and latitude coordinate values. The SBFGC 802 first uses any hashing algorithm to map the coordinate values for location $L_Y$ into a hash code. For instance, the SBFGC 802 can use the Geohash algorithm, which, in turn, uses a Z-order curve to encode locations. The elements of a hash code generated by a hierarchical hashing algorithm, such as the Geohash algorithm, represent a location in successively smaller levels of geographic granularity, moving across the elements of the code from left to right. The SBFGC 802 can then discard a set of the g most significant bits of the hash code and the h least significant bits of the hash code, based on any environment-specific setting of g and h. The remaining middle bits of code describe a region $R_Y$ of prescribed size that includes the location $L_Y$. That is, by removing the most significant bits, the SBFGC 802 eliminates information regarding the placement of the region $R_Y$ in the world. Losing this high-level contextual information is acceptable in those application environments in which the user's driving takes place within only a part of the world (e.g., in one or more countries). Removing the least significant bits broadens the scope of analysis from the specific location $L_Y$ to region $R_Y$, which includes $L_Y$. Overall, truncation of the location information serves the goal of producing sparse feature information.

The SBFGC 802 then retrieves count information $N_B^{R_Y}$ from the data store 804 which describes the number of times that the user has visited region $R_Y$ for business reasons, and count information $N_P^{R_Y}$ that describes the number of times that the user has visited region $R_Y$ for personal reasons. If the user has never visited this region $R_Y$, then these two counts will be zero. Finally, the SBFGC 802 computes a feature for location $L_Y$ based on the ratio of $N_B^{R_Y}$ to $N_P^{R_Y}$. The SBFGC 802 can perform the same operation with respect to the starting location $L_X$.

Time.

The SBFGC 802 can generate a feature for time $T_Y$ by first identifying the bin ($G_Y$) to which the time $T_Y$ belongs. Different environments can define different sets of bins having different levels of temporal granularity. For example, one environment can define unique bins for each day of the week, and for each hour of the day. In this framework, if $T_Y$ is Tuesday, 7:14 AM, then the matching bin ($G_Y$) corresponds to Tuesday, 7-to-8 AM. Other implementations can change the duration associated with the bins, e.g., by providing bins associated with every half-hour segment of the day. Alternatively, or in addition, other implementations can define bins using additional dimensions, such as by taking month in account, etc.

The SBFGC 802 then retrieves count information $N_B^{G_Y}$ that describes the total number of times that the user has visited any location for business purposes within the identified temporal bin $G_Y$, and count information $N_P^{G_Y}$ that describes the total number of times that the user has visited any location for personal purposes within the same temporal bin $G_Y$. The SBFGC 802 then computes the feature for $T_Y$ based on the ratio of $N_B^{G_Y}$ to $N_P^{G_Y}$. The SBFGC can generate a similar time-based feature for the departure time $T_X$.

Distance.

The SBFGC 802 can generate distance-based features for a distance d (associated with the current journey) by retrieving the median distance $M_B$ for all prior business trips that the user has taken to any location, and the median distance $M_P$ for all prior personal trips that the user has taken to any location. It can then compute a first distance-based feature by taking the absolute difference between d and $M_B$, and a second distance-based feature by taking the absolute difference between d and $M_P$. The SBFGC 802 can also optionally generate these features for drives specifically taken to location $L_Y$, or from location $L_X$, or with respect to time $T_Y$, etc.

Totals.

Totals. The SBFGC 802 can also generate a feature based on the total number of visits (regardless of purpose) that the user has made to region $R_Y$ associated with $L_Y$. Similarly, the SBFGC 802 can generate a feature based on the total number of visits that the user has taken which resulted in arrival at time $T_Y$ (that is, with respect to the time bin $G_Y$ associated with time $T_Y$). The SBFGC 802 can do the same with respect to $L_X$ and $T_X$. These features provide context that helps the model 718 interpret the significance of the other statistical features. For example, the significance of the user's drive to a particular site for business purposes increases in proportion to the user's repetition of this pattern. A single visit to this site for business purposes has lower confidence.

The feature-generating component 714 can provide one or more other types of features that depend on the classification of one or more journeys ($J_{c-1}$, $J_{c-2}$, . . . ) that precede the journey ($J_c$) under consideration, and/or one or more journeys ($J_{c+1}$, $J_{c+2}$, . . . ) that follow the journey ($J_c$) under consideration, to the extent known. The JCE 210 can facilitate the calculation of this feature in the manner described above, e.g., by encouraging the user to classify consecutive journeys. By doing so, the feature-generating component 714 can generate a more robust set of features for any journey under consideration that is temporally proximate to one or more already-classified journeys. Note that the training engine 720 can account for the case in which a user will not have many consecutively-classified journeys (at least initially) by performing its training using a training set that is similarly deficient in this regard.

The feature-generating component 714 can generate many other types of features, including, but not limited to: one or more other features which describe the distance d of the journey; one or more other features that describes any available information regarding the starting location ($L_X$), such as its location coordinates, its name, etc.; one or more other features that describe any available information regarding the ending location ($L_Y$); one or more other features that describe the starting time ($T_X$); one or more other features that describe the ending time ($T_Y$); one or more features that characterize the user and his or her preferences; one or more features that describe the user's known calendar commitments; one or more features that depend on BLUETOOTH signals, or WI-FI signals, etc., detectable at a location under consideration, and so on. This set of additional features is to be understood in the spirit of illustration, not limitation.

By virtue of the features used, the JCE 210 can rapidly personalize the operation of the model 718 to a user without retraining the model 718 itself (e.g., without updating its weight values). This is because at least some of the features accurately capture patterns of the user's travel-related behavior based on a relatively small number of user-confirmed classifications. Further, the features provide a concise representation of the user's travel-related behavior. Overall, these characteristics enable the JCE 210 to quickly provide accurate classification results to the user soon after he or she begins using the JPS 202. This outcome, in turn, will reduce the risk that the user will become unhappy with the JPS 202 and stop using it. The JCE 210 also provides good performance, as it does not require the time-intensive task of retraining the model 718. Finally, the JCE 210 also makes efficient use of resources, as it can forgo the use of processing, memory, and power resources that would otherwise be required for retraining the model 718.

Note that the model 718 that a new user receives from the training engine 720 may include weight values generated based on classified journeys associated with a large number of users. Hence, these weight values also embody knowledge about what kinds of journeys likely correspond to business trips, and what kinds of journeys likely correspond to personal trips. The subsequent feature-based personalization performed by the JCE 210, as described above, should therefore be interpreted as supplementing the knowledge that is already embedded in the trained model 718.

But note that, while personalization can occur without retraining the model 718, the training engine 720 can also optionally retrain the weight values of the model 718 on a periodic and/or on-demand basis. In doing so, the training engine 720 can optionally take into account some or all of the journeys classified by the user. As described above, the JPS 202 can perform training at the level of each local computing device, or at the backend system 306, or at a combination of local and remote sites.

Finally, note that some users may manually classify only business journeys (by skipping the classification of personal journeys). The JCE 210 can account for these types of users in various ways, such as by automatically labeling unclassified journeys as "personal," or by reminding the user to classify their personal journeys.

An input vector-generating component 806 generates an input vector that encodes the above-described features. The input vector corresponds to the information that is fed to the input layer of the classifying component 716. The input vector-generating component 806 can use different techniques to generate the input vector. For example, the input vector can have a plurality of dimensions associated with different features. In that case, the input vector-generating component 806 can encode the features by setting appropriate values in appropriate slots of the input vector.

Now referring to the classifying component 716, this component can be implemented as any type of machine-trainable model or any type of statistical computation. As shown here, the classifying component 716 is implemented as an p-layer feed-forward neural network 808. In merely one non-limiting environment, n=3, and each layer includes about 400,000 units. Such a classifying component 716 is relatively compact and will consume a relatively modest amount of power to run. The sparseness of the feature set is one factor that accommodates the use of a relatively small classifying component 716. Overall, the relatively small size of the classifying component 716 enables a wide range of computing devices to run the JPS 202, including portable devices having limited power, processing, and/or storage resources. Further, the use of a relatively small classifying component 716 offers good performance, and makes efficient use of processing, memory, and power resources.

The values in any layer j of a feed-forward network may be given by the formula, $z_j = f(W_j z_{j-1} + b_j)$, for j=2, . . . N. The symbol $W_j$ denotes a j-th machine-learned weight matrix, and the symbol $b_j$ refers to an optional j-th machine-learned bias vector. The activation function $f(x)$ can be formulated in different ways, such as the tan h function, or the rectified linear (ReLU) function, etc. An optional softmax component 810 operates on the output of the preceding layers using a normalized exponential function, to generate final output information.

In one case, the output information indicates the probability that a journey under consideration is a business or personal drive. In other cases, the classifying component 716 can produce output information that identifies a most likely classification among a set of three or more possible classifications. For instance, the classifying component 716 can produce an output vector in a semantic space. The "location" of that vector in the semantic space identifies the most likely classification of the journey under consideration.

Other implementations can use other types of machine-trainable models, such as other types of neural networks (such as Convolutional Neural Networks (CNNs), etc.), Support Vector Machine (SVM) models, decision tree models, linear regression classifier models, Bayesian models, and so on.

B. Illustrative Processes

Figure 9:
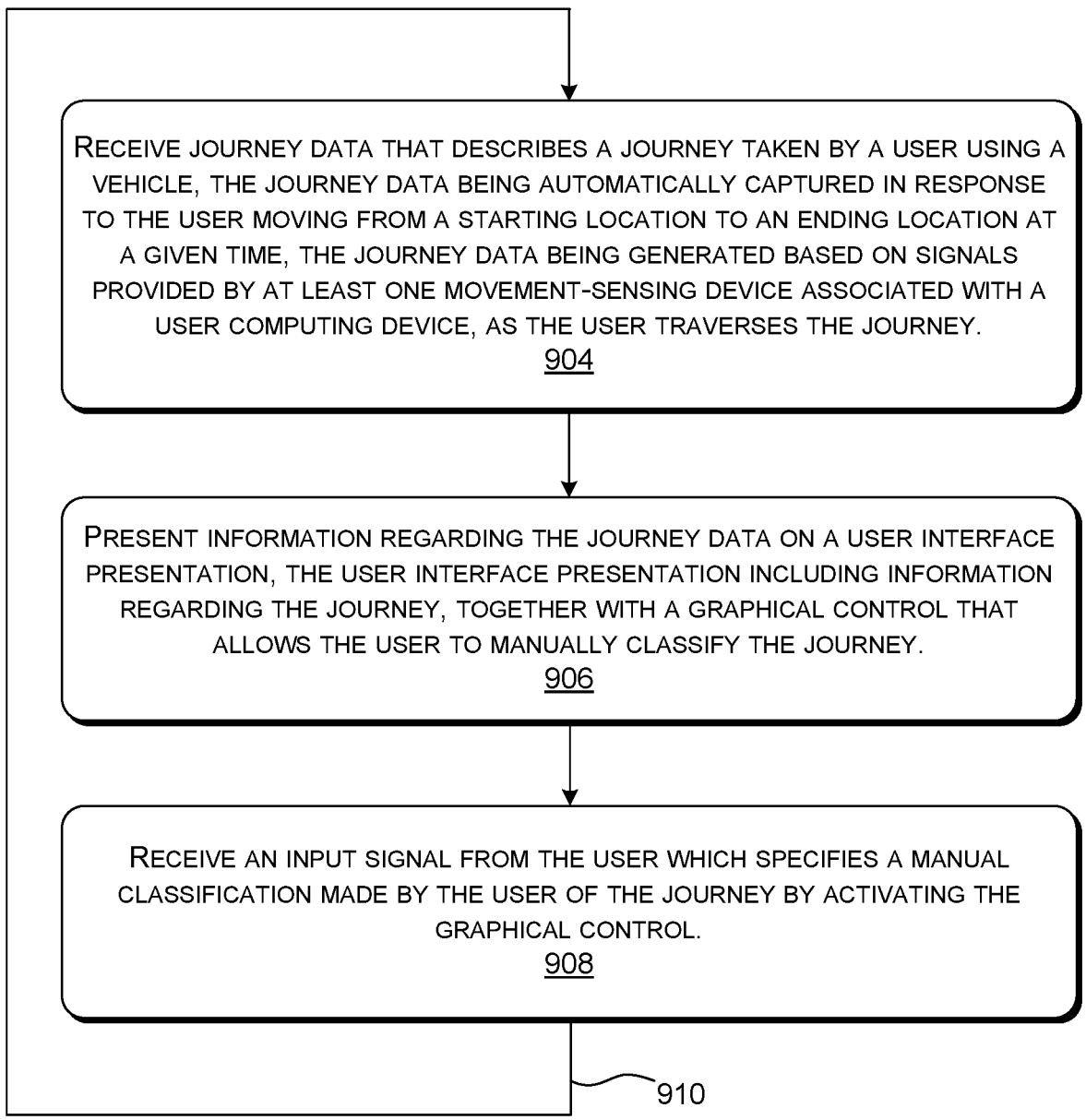
FIG. 9 is a flowchart that shows an illustrative manual classification procedure.

FIGS. 9 and 10 show processes that explain the operation of the journey-processing system (JPS) 202 of Section A in flowchart form. Since the principles underlying the operation of the JPS 202 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 9 is a flowchart that shows an illustrative manual classification procedure 902, e.g., as exemplified by the user's interaction with the user interface presentation 402 shown in FIG. 4. In block 904, the JPS 202 receives journey data that describes a journey taken by a user using a vehicle 104. The journey data is automatically captured in response to the user moving from a starting location to an ending location at a given time, and is generated based on signals provided by at least one movement-sensing device associated with a user computing device 106, as the user traverses the journey. In block 906, the JPS 202 presents information regarding the journey data on a user interface presentation (such as the user interface presentation 402). The user interface presentation includes information regarding the journey, together with a graphical control 418 that allows the user to manually classify the journey. In block 908, the JPS receives an input signal from the user which specifies a manual classification made by the user of the journey by activating the graphical control 418, e.g., by swiping left or right in the manner shown in FIG. 4. Arrow 910 indicates that the procedure 902 may be repeated any number of times.

FIG. 10 is a flowchart that shows an illustrative model-assisted procedure 1002, e.g., as exemplified by the user's interaction with the user interface presentations (502, 602) of FIGS. 5 and 6. In block 1004, an implementing computing device receives a machine-trainable model 718 from a backend system 306, the backend system 306 being implemented by one or more servers. This operation may involve downloading an application that implements the JPS 202, which includes the machine-trainable model 718 as part thereof. In block 1006, the JPS 202 receives journey data that describes a journey taken by a user using a vehicle 104. As before, the journey data is automatically captured in response to the user moving from a starting location to an ending location at a given time, and is generated based on signals provided by at least one movement-sensing device associated with a user computing device 106, as the user traverses the journey. In block 1008, the JPS 202 generates a set of features that characterize the journey data. In block 1010, the JPS 202 uses the machine-trainable model 718 to automatically classify a purpose of the journey based on the features, to generate a proposed classification. In block 1012, the JPS 202 presents the proposed classification on a user interface presentation (such as the user interface presentation 502). That is, the JPS 202 presents the proposed classification with zero, one, or more other proposed classifications. It also presents a graphical control 510 for changing the proposed classification to another classification, and another graphical control 608 for confirming all of the proposed classifications in the user interface presentation. In block 1014, the JPS 202 receives an input signal that indicates that the user has confirmed a specified classification of the journey by activating the graphical control 608, the specified classification corresponding to the proposed classification or a modification to the proposed classification as selected by the user by activating the graphical control 510. Arrow 1016 indicates that the procedure 1002 may be repeated any number of times.

In general, note that personalization of the machine-trainable model 718 for the user increases as the user manually and successively provides input signals to classify journeys via the manual classification procedure 902 of FIG. 9 and/or confirms specified classifications via the model-assisted classification procedure 1002 of FIG. 10. More specifically, the personalization increases in response to, at least in part, progressive refinement of the set of features. In some implementations, the JPS 202 performs its classifications, at least in part, on a local computing device, based on locally-stored journey data.

C. Representative Computing Device

Figure 11:
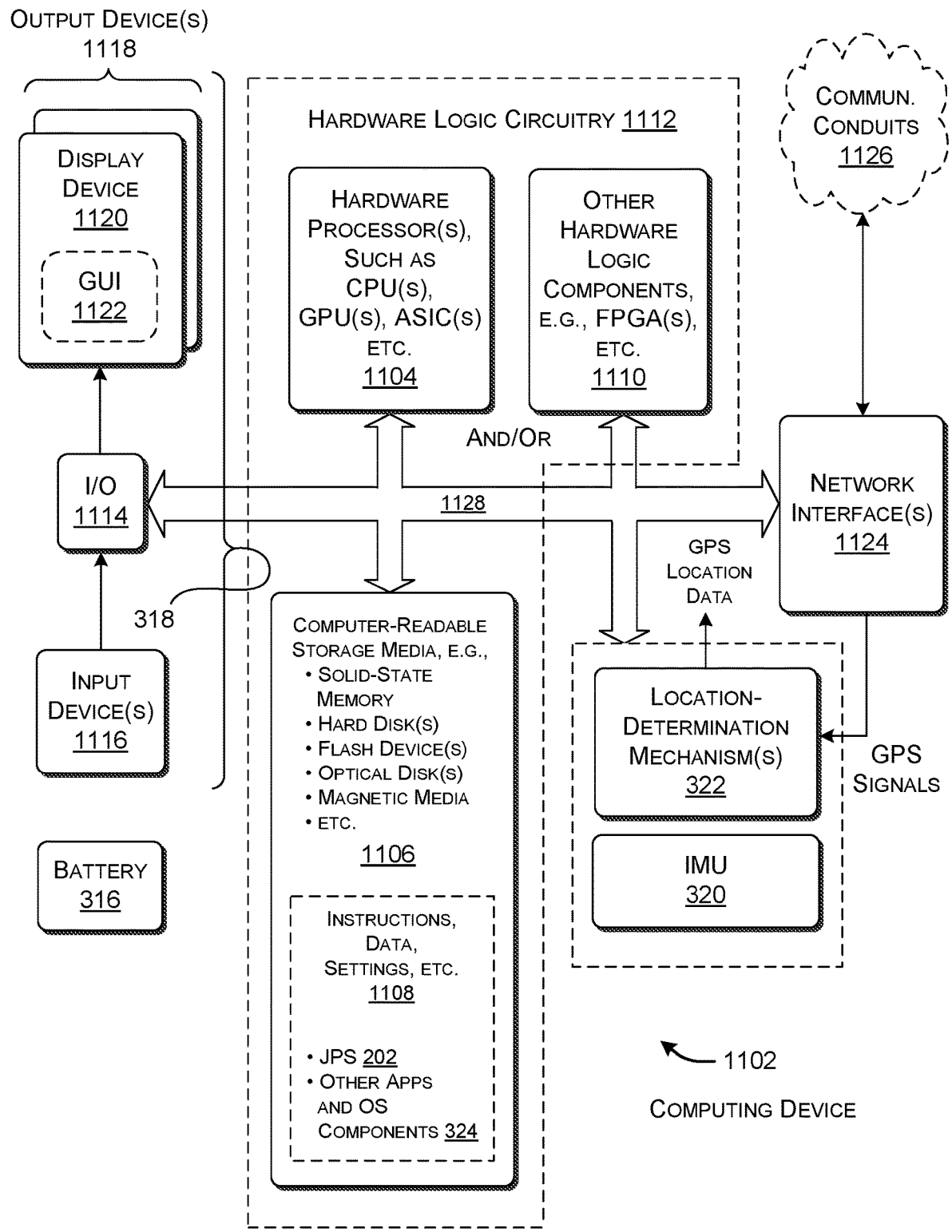
FIG. 11 shows illustrative device hardware that can be used to implement any aspect of the features shown in the foregoing drawings.

FIG. 11 shows a computing device 1102 that can be used to implement any aspect of the mechanisms set forth in the above-described figures. For instance, with reference to FIG. 2, the type of computing device 1102 shown in FIG. 11 can be used to implement the local computing device 304. Or the type of computing device 1102 can be used to implement any server provided by the backend system 306. In all cases, the computing device 1102 represents a physical and tangible processing mechanism.

The computing device 1102 can include one or more hardware processors 1104. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1102 can also include computer-readable storage media 1106, corresponding to one or more computer-readable media hardware units. The computer-readable storage media 1106 retains any kind of information 1108, such as machine-readable instructions, settings, data, etc. Without limitation, for instance, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable component of the computing device 1102. Further, any instance of the computer-readable storage media 1106 may provide volatile or non-volatile retention of information.

The computing device 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing device 1102, and/or a hardware storage unit (such as a hard disk) for retaining/archiving information on a more permanent basis. In the latter case, the computing device 1102 can also include one or more drive mechanisms (not shown) for storing and retrieving information from an instance of the computer-readable storage media 1106.

The computing device 1102 may perform any of the functions described above when the hardware processor(s) 1104 carry out computer-readable instructions stored in any instance of the computer-readable storage media 1106. For instance, the computing device 1102 may carry out computer-readable instructions to perform each block of the processes described in Section B.

Alternatively, or in addition, the computing device 1102 may rely on one or more other hardware logic components 1110 to perform operations using a task-specific collection of logic gates. For instance, the hardware logic component(s) 1110 may include a fixed configuration of hardware logic gates, e.g., that are created and set at the time of manufacture, and thereafter unalterable. Alternatively, or in addition, the other hardware logic component(s) 1110 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1112 includes any combination of the hardware processor(s) 1104, the computer-readable storage media 1106, and/or the other hardware logic component(s) 1110. That is, the computing device 1102 can employ any combination of the hardware processor(s) 1104 that execute machine-readable instructions provided in the computer-readable storage media 1106, and/or one or more other hardware logic component(s) 1110 that perform operations using a fixed and/or programmable collection of hardware logic gates. More generally stated, the hardware logic circuitry 1112 corresponds to one or more hardware logic components of any type(s) that perform operations based on logic stored in and/or otherwise embodied in the hardware logic component(s).

In some cases (e.g., in the case in which the computing device 1102 represents a user computing device), the computing device 1102 also includes an input/output interface 1114 for receiving various inputs (via input devices 1116), and for providing various outputs (via output devices 1118). Illustrative input devices include a keyboard device, a mouse input device, a touchscreen input device, a digitizing pad, one or more static image cameras, one or more video cameras, one or more depth camera systems, one or more microphones, a voice recognition mechanism, and so on. One particular output mechanism may include a display device 1120 and an associated graphical user interface presentation (GUI) 1122. The display device 1120 may correspond to a liquid crystal display device, a light-emitting diode display (LED) device, a projection mechanism, etc. Other output devices include a printer, one or more speakers, a haptic output mechanism, an archival mechanism (for storing output information), and so on.

The computing device 1102 also includes one or more location-determination mechanisms 322 for generating location data based on signals received from the external source(s) 108. For example, one such location-determination mechanism can provide GPS location data based on received GPS signals. An inertial measurement unit (IMU) 320 generates movement signals using one or more accelerometers, one or more gyroscopes, one or more magnetometers, etc.

The computing device 1102 can also include one or more network interfaces 1124 for exchanging data with other devices via one or more communication conduits 1126. The network interface(s) 1124 can include the communication mechanism(s) 314 described in FIG. 2. The communication conduit(s) 1126 can encompass a wireless network implemented by the communication system(s) 310. More generally, the communication conduit(s) 1126 can include any combination of hardwired links, wireless links, routers, gateway functionality, name servers, etc., governed by any protocol or combination of protocols.

One or more communication buses 1128 communicatively couple the above-described components together. A battery 316 and/or other power source provides power to all of the above-described components.

FIG. 11 shows the computing device 1102 as being composed of a discrete collection of separate units. In some cases, the collection of units may correspond to discrete hardware units provided in a computing device chassis having any form factor. In other cases, the computing device 1102 can include a hardware logic component that integrates the functions of two or more of the units shown in FIG. 1. For instance, the computing device 1102 can include a system on a chip (SoC or SOC), corresponding to an integrated circuit that combines the functions of two or more of the units shown in FIG. 11.

The following summary provides a non-exhaustive set of illustrative aspects of the technology set forth herein.

According to a first aspect, one or more computing devices for assisting a user in classifying journeys are described. The computing device(s) include hardware logic circuitry, corresponding to: (a) one or more hardware processors that perform operations by executing machine-readable instructions stored in a memory, and/or (b) one or more other hardware logic components that perform operations using a task-specific collection of logic gates. The operations include, receiving a machine-trainable model from a backend system, the backend system being implemented by one or more servers. In a model-assisted classification procedure, the operation further include: receiving journey data that describes a journey taken by a user using a vehicle, the journey data being automatically captured in response to the user moving from a starting location to an ending location at a given time, the journey data being generated based on signals provided by at least one movement-sensing device associated with a user computing device, as the user traverses the journey; generating a set of features that characterize the journey data; using the machine-trainable model to automatically classify a purpose of the journey based on the features, to generate a proposed classification; presenting the proposed classification on a user interface presentation with zero, one, or more other proposed classifications, the user interface presentation presenting a first graphical control for changing the proposed classification to another classification, and a second graphical control for confirming all of the proposed classifications in the user interface presentation; and receiving an input signal that indicates that the user has confirmed a specified classification of the journey by activating the second graphical control, the specified classification corresponding to the proposed classification or a modification to the proposed classification as selected by the user by activating the first graphical control. The operations further include repeating a manual classification procedure and/or the model-assisted classification procedure a plurality of times. Personalization of the machine-trainable model for the user increases as the user successively provides input signals to manually classify journeys via the manual classification procedure and/or confirms specified classifications via the model-assisted classification procedure. More specifically, the personalization increases in response to, at least in part, progressive refinement of the set of features.

According to a second aspect, the operations further include, in the manual classification procedure: receiving other journey data associated with another journey; presenting information regarding the other journey data on another user interface presentation, the other user interface presentation including information regarding the other journey, together with a third graphical control that allows the user to manually classify the other journey; and receiving an input signal from the user which specifies a manual classification made by the user of the other journey by activating the third graphical control.

According to a third aspect, dependent on the second aspect, the model-assisted classification procedure is made available to the user after the user has classified a prescribed number of journeys using the manual classification procedure.

According to a fourth aspect, the proposed classification indicates whether the journey is a business-related journey or a personal journey.

According to a fifth aspect, the proposed classification is selected from a set of three of more possible classifications.

According to a sixth aspect, the personalization is achieved without retraining the machine-trainable model.

According to a seventh aspect, the operations further include updating a count of a number of journeys that have been assigned to the specified classification, in response to receiving of the input signal. A subsequent instance of the generating operation (for generating the set of features) depends, in part, on the count. Further, the personalization depends, in part, on the count.

According to an eighth aspect, at least one feature is based on statistical information regarding at least one aspect of prior journeys that the user has taken.

According to a ninth aspect, dependent on the eighth aspect, a feature is based, at least in part, on a number of times that the user has visited the ending location for a particular purpose.

According to a tenth aspect, dependent on the eighth aspect, a feature is based, at least in part, on a number of times that the user has taken a journey at the given time for a particular purpose.

According to an eleventh aspect, dependent on the eighth aspect, a feature is based, at least in part, on a statistical measure of distances of previous journeys that the user has taken for a particular purpose.

According to a twelfth aspect, a feature is based on a classification of a preceding and/or subsequent journey that the user has taken, with respect to the journey for which the classification is made.

According to a thirteenth aspect, the machine-trainable model is a neural network.

According to a fourteenth aspect, the model-assisted procedure is performed for a batch of journeys to generate a batch of proposed classifications. The presenting operation includes presenting the batch of proposed classifications to the user via the user interface presentation. The receiving of the input signal includes receiving an indication that the user has confirmed specified classifications associated with the entire batch of journeys, each specified classification corresponding to a proposed classification as originally provided or a classification as modified by the user.

According to a fifteenth aspect, the progressive refinement of the set of features is performed on a local computing device associated with the user.

According to a sixteenth aspect, a computer-readable storage medium for storing computer-readable instructions is described. The computer-readable instructions, when executed by one or more hardware processors, perform a method that includes a model-assisted classification procedure and a manual procedure. The model-assisted classification procedure involves: receiving journey data that describes a journey taken by a user using a vehicle, the journey data being automatically captured in response to the user moving from a starting location to an ending location at a given time; generating a set of features that characterize the journey data; using a journey-classifying engine to automatically classify a purpose of the journey based on the features, to generate a proposed classification; presenting the proposed classification on a user interface presentation; and receiving an input signal that indicates that the user has confirmed a specified classification of the journey, via interaction by the user with the user interface presentation, the specified classification corresponding to the proposed classification or a modification to the proposed classification as selected by the user via the user interface presentation. The manual classification procedure includes: receiving other journey data associated with another journey; presenting information regarding the other journey data on another user interface presentation; and receiving an input signal from the user which specifies a manual classification made by the user of the other journey, via interaction by the user with the other user interface presentation. The method further includes repeating the manual classification procedure and/or the model-assisted classification procedure a plurality of times. Personalization of the journey-classifying engine for the user increases as the user successively provides input signals to manually classify journeys via the manual classification procedure and/or confirms specified classifications via the model-assisted classification procedure. Each instance of journey data associated with a particular journey is generated based on signals provided by at least one movement-sensing device associated with a user computing device, as the user traverses the particular journey.

According to a seventeenth aspect, a method is described, implemented by one or more computing devices, for assisting a user in classifying journeys. The method includes, in a model-assisted classification procedure: receiving journey data that describes a journey taken by a user using a vehicle, the journey data being automatically captured in response to the user moving from a starting location to an ending location at a given time, the journey data being generated based on signals provided by at least one movement-sensing device associated with a user computing device, as the user traverses the journey; generating a set of features that characterize the journey data, at least one feature being based on statistical information regarding at least one aspect of prior journeys that the user has taken; using a journey-classifying engine to automatically classify a purpose of the journey based on the features, to generate a proposed classification; and presenting the proposed classification on a user interface presentation. The generating, using, and presenting operations are performed, at least in part, on a local computing device, based on locally-stored journey data.

According to an eighteenth aspect, dependent on the seventeenth aspect, the method further includes receiving an input signal that indicates that the user has confirmed a specified classification of the journey, via interaction by the user with the user interface presentation, the specified classification corresponding to the proposed classification or a modification to the proposed classification as selected by the user via the user interface presentation. The method further includes repeating a manual classification procedure and/or the model-assisted classification procedure a plurality of times. Personalization of the journey-classifying engine for the user increases as the user successively provides input signals to manually classify journeys via the manual classification procedure and/or confirms specified classifications via the model-assisted classification procedure According to a nineteenth aspect, dependent on the seventeenth aspect, the aforementioned at least one feature includes: a feature that is based, at least in part, on a number of times that the user has visited the ending location for a particular purpose; and/or a feature that is based, at least in part, on a number of times that the user has taken a journey at the given time for a particular purpose; and/or a feature that is based, at least in part, on a statistical measure of distances of previous journeys that the user has taken for a particular purpose.

According to a twentieth aspect, dependent on the seventeenth aspect, the generating operation is performed for a batch of journeys to generate a batch of proposed classifications. The presenting operation includes presenting the batch of proposed classifications to the user via the user interface presentation. The method further includes receiving an input signal that provides an indication that the user has confirmed specified classifications associated with the entire batch of journeys, each specified classification corresponding to a proposed classification as originally provided or a classification as modified by the user.

A twenty-first aspect corresponds to any combination (e.g., any logically-consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for assisting a user in classifying journeys, comprising:
    in a model-assisted classification procedure:
        receiving journey data that describes a particular journey taken by the user using a vehicle, the journey data being automatically captured in response to the user moving from a starting location to an ending location;
        generating a set of features that characterize the journey data;
        using a journey-classifying engine to automatically classify a purpose of the particular journey based on the set of features, to generate a proposed classification;
        presenting the proposed classification on a first user interface presentation in a first batch of classifications that includes other proposed classifications for other journeys, the particular journey and the other journeys having been validated as being completed journeys prior to classification of the particular journey and classification of the other journeys by a machine-trainable model; and
        receiving a first input signal that indicates that the user has confirmed correctness of all classifications in the first batch of classifications, via interaction by the user with the first user interface presentation,
        the model-assisted classification procedure being configured to present a second batch of classifications in response to receiving the first input signal; and
    in a manual classification procedure:
        receiving other journey data associated with another journey that has been completed;
        presenting information regarding the other journey data on a second user interface presentation that is different than the first user interface presentation; and
        receiving a second input signal from the user which specifies a manual classification made by the user of a purpose of said another journey, via interaction by the user with the second user interface presentation,
    repeating the manual classification procedure a plurality of times, followed by the model-assisted classification procedure another plurality of times, personalization of the journey-classifying engine for the user increasing as the user successively provides input signals to manually classify journeys via the manual classification procedure using the second user interface presentation and confirms specified classifications via the model-assisted classification procedure using the first user interface presentation,
    each instance of journey data associated with a given journey being generated based on signals provided by at least one movement-sensing device associated with a user computing device, as the user traverses the given journey.

2. The method of claim 1,
    wherein the method further includes updating a count of a number of journeys that have been assigned to a given classification, in response to said receiving of the first input signal,
    wherein a subsequent instance of said generating of the set of features depends, in part, on the count, and
    wherein the personalization depends, in part, on the count.

3. The method of claim 1, wherein at least one feature is based on statistical information regarding at least one aspect of prior journeys that the user has taken.

4. The method of claim 1, wherein at least one feature is based on a classification of a preceding and/or subsequent journey that the user has taken, with respect to the particular journey for which the classification is made.

5. The method of claim 1, wherein the personalization is achieved without retraining the machine-trainable model, by adjusting counts in a data store.

6. The method of claim 1, wherein the model-assisted classification procedure is made available to the user via a graphical prompt that is presented in response to a determination that the user has classified a prescribed number of journeys using the manual classification procedure.

7. The method of claim 1, further including guiding the user to confirm classifications of selected journeys in an identified order, the identified order being selected based on an assessment of impact of the identified order on learning in the machine-trainable model.

8. The method of claim 1, wherein the set of features includes plural ratios, each of the plural ratios being a ratio of a first number of journeys to a second number of journeys.

9. The method of claim 1, wherein one feature in the set of features expresses a ratio of: a number of journeys that the user has taken to the ending location for a first purpose; and a number of journeys that the user has taken to the ending location for a second purpose that is different than the first purpose.

10. The method of claim 1, wherein one feature in the set of features expresses a ratio of: a number of journeys that the user has taken for a first purpose, starting from the starting location; and a number of journeys that the user has taken for a second purpose that is different than the first purpose, starting from the starting location.

11. The method of claim 1, wherein one feature in the set of features expresses: a number of journeys that the user has taken to any location for a particular purpose within a specified span of time; and a number of journeys that the user has taken to any location for any purpose other than the particular purpose within the specified span of time.

12. The method of claim 3, wherein the particular journey has a particular distance, and wherein at least one feature in the set of features expresses a difference between the particular distance and a median distance of a group of other journeys to any locations that the user has taken for a particular purpose.

13. The method of claim 1, wherein the first input signal is received in response to interaction by the user with a graphical control provided by the first user interface presentation.

14. Further including inviting the user to use the model-assisted classification procedure in response to a determination that the user has classified a prescribed number of journeys using the manual classification procedure via the second user interface presentation.

15. A journey-processing system, comprising:
hardware logic circuitry configured hardware logic circuitry, the hardware logic circuitry corresponding to: (a) one or more hardware processors that perform operations by executing machine-readable instructions stored in a memory, and/or (b) one or more other hardware logic components that perform operations using a collection of logic gates, the operations including:
in a model-assisted classification procedure:
receiving journey data that describes a particular journey taken by a user using a vehicle, the journey data being automatically captured in response to the user moving from a starting location to an ending location;
generating a set of features that characterize the journey data;
using a journey-classifying engine to automatically classify a purpose of the particular journey based on the set of features, to generate a proposed classification;
presenting the proposed classification on a first user interface presentation in a first batch of classifications that includes other proposed classifications for other journeys, the particular journey and the other journeys having been validated as being completed journeys prior to classification of the particular journey and classification of the other journeys by a machine-trainable model; and
receiving a first input signal that indicates that the user has simultaneously confirmed correctness of plural classifications in the first batch of classifications, via interaction by the user with the first user interface presentation,
the model-assisted classification procedure being configured to present a second batch of classifications in response to receiving the first input signal; and
in a manual classification procedure:
receiving other journey data associated with another journey that has been completed;
presenting information regarding the other journey data on a second user interface presentation that is different than the first user interface presentation; and
receiving a second input signal from the user which specifies a manual classification made by the user of a purpose of said another journey, via interaction by the user with the second user interface presentation,
repeating the manual classification procedure a plurality of times, followed by the model-assisted classification procedure another plurality of times, personalization of the journey-classifying engine for the user increasing as the user successively provides input signals to manually classify journeys via the manual classification procedure using the second user interface presentation and confirms specified classifications via the model-assisted classification procedure using the first user interface presentation,
each instance of journey data associated with a given journey being generated based on signals provided by at least one movement-sensing device associated with a user computing device, as the user traverses the given journey.

16. The journey-processing system of claim 15, wherein one feature in the set of features expresses a ratio of: a number of journeys that the user has taken to the ending location for a first purpose; and a number of journeys that the user has taken to the ending location for a second purpose that is different than the first purpose.

17. The journey-processing system of claim 15, wherein one feature in the set of features expresses a ratio of: a number of journeys that the user has taken for a first purpose, starting from the starting location; and a number of journeys that the user has taken for a second purpose that is different than the first purpose, starting from the starting location.

18. The journey-processing system of claim 15, wherein one feature in the set of features expresses: a number of journeys that the user has taken to any location for a particular purpose within a specified span of time; and a number of journeys that the user has taken to any location for any purpose other than the particular purpose within the specified span of time.

19. The journey-processing system of claim 15, wherein the operations further include inviting the user to use the model-assisted classification procedure in response to a determination that the user has classified a prescribed number of journeys using the manual classification procedure via the second user interface presentation.

20. A computer-readable storage medium for storing computer-readable instructions, one or more hardware processors executing the computer-readable instructions to perform operations comprising:

in a model-assisted classification procedure:
receiving journey data that describes a particular journey taken by a user using a vehicle, the journey data being automatically captured in response to the user moving from a starting location to an ending location;
generating a set of features that characterize the journey data;
using a journey-classifying engine to automatically classify a purpose of the particular journey based on the set of features, to generate a proposed classification;
presenting the proposed classification on a first user interface presentation in a first batch of classifications that includes other proposed classifications for other journeys, the particular journey and the other journeys having been validated as being completed journeys prior to classification of the particular journey and classification of the other journeys by a machine-trainable model; and
receiving a first input signal that indicates that the user has simultaneously confirmed correctness of plural classifications in the first batch of classifications, via interaction by the user with the first user interface presentation,
the model-assisted classification procedure being configured to present a second batch of classifications in response to receiving the first input signal; and in a manual classification procedure:
receiving other journey data associated with another journey that has been completed;
presenting information regarding the other journey data on a second user interface presentation that is different than the first user interface presentation; and
receiving a second input signal from the user which specifies a manual classification made by the user of a purpose of said another journey, via interaction by the user with the second user interface presentation, repeating the manual classification procedure a plurality of times, followed by the model-assisted classification procedure another plurality of times, personalization of the journey-classifying engine for the user increasing as the user successively provides input signals to manually classify journeys via the manual classification procedure using the second user interface presentation and confirms specified classifications via the model-assisted classification procedure using the first user interface presentation, each instance of journey data associated with a given journey being generated based on signals provided by at least one movement-sensing device associated with a user computing device, as the user traverses the given journey.

* * * * *